United States Patent
Suzuki et al.

(10) Patent No.: US 9,904,531 B2
(45) Date of Patent: Feb. 27, 2018

(54) APPARATUS AND METHOD FOR INSTALLING VEHICLE CORRECTION PROGRAM

(71) Applicants: FUJITSU LIMITED, Kawasaki-shi, Kanagawa (JP); TOYOTA JIDOSHA KABUSHIKI KAISHA, Toyota-shi, Aichi-ken (JP)

(72) Inventors: Masato Suzuki, Chofu (JP); Seigo Kotani, Kobe (JP); Hisashi Oguma, Kawasaki (JP)

(73) Assignees: FUJITSU LIMITED, Kawasaki (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 31 days.

(21) Appl. No.: 14/494,903

(22) Filed: Sep. 24, 2014

(65) Prior Publication Data

US 2015/0113521 A1    Apr. 23, 2015

(30) Foreign Application Priority Data

Oct. 18, 2013    (JP) .................. 2013-217834

(51) Int. Cl.
  *G06F 9/445*    (2006.01)
(52) U.S. Cl.
  CPC ............. *G06F 8/65* (2013.01); *Y02B 60/183* (2013.01)
(58) Field of Classification Search
  None
  See application file for complete search history.

(56) References Cited

U.S. PATENT DOCUMENTS

| 6,715,068 | B1* | 3/2004 | Abe .................................. 713/1 |
| 2006/0075307 | A1 | 4/2006 | Sano |
| 2007/0088952 | A1 | 4/2007 | Hewitt et al. |
| 2008/0140941 | A1* | 6/2008 | Dasgupta et al. ............ 711/137 |
| 2010/0307882 | A1 | 12/2010 | Ullrich et al. |

(Continued)

FOREIGN PATENT DOCUMENTS

| CN | 102378966 A | 3/2012 |
| EP | 2 239 663 A1 | 10/2010 |

(Continued)

OTHER PUBLICATIONS

Nilsson et al., "A framework for self-verification of firmware updates over the air in vehicle ECUs." Globecom Workshops, 2008 IEEE. IEEE, 2008.*

(Continued)

*Primary Examiner* — Chameli Das
*Assistant Examiner* — Joanne Macasiano
(74) *Attorney, Agent, or Firm* — Staas & Halsey LLP

(57) ABSTRACT

A program stored in a computer-readable medium causes a computer to execute a process includes receiving, from an automobile in which a control program for controlling devices mounted on the automobile operates, an update request concerning the control program, classifying a plurality of correction programs corresponding to the update request into a plurality of groups on the basis of usable electric energy of a battery corresponding to a vehicle type to which the automobile belongs, an amount of the usable electric energy being stored in a memory, and transmitting the classified correction programs to the automobile for each of the groups.

15 Claims, 14 Drawing Sheets

(56) References Cited

U.S. PATENT DOCUMENTS

| | | | |
|---|---|---|---|
| 2011/0222447 A1* | 9/2011 | Wang et al. | 370/310 |
| 2011/0307882 A1 | 12/2011 | Shiba | |
| 2012/0005125 A1* | 1/2012 | Jammer | B60L 11/1848 |
| | | | 705/412 |
| 2013/0179877 A1* | 7/2013 | Dain | G06F 8/60 |
| | | | 717/178 |
| 2013/0261942 A1* | 10/2013 | McQuade | F02D 29/02 |
| | | | 701/115 |
| 2014/0109075 A1* | 4/2014 | Hoffman et al. | 717/169 |
| 2014/0359593 A1* | 12/2014 | Cohen | G06F 8/65 |
| | | | 717/169 |

FOREIGN PATENT DOCUMENTS

| | | |
|---|---|---|
| JP | 2004-326287 | 11/2004 |
| JP | 2008-524727 | 7/2008 |
| JP | 2013-37474 | 2/2013 |
| JP | 2013-84143 | 5/2013 |
| WO | WO 2006/066322 A1 | 6/2006 |
| WO | 2009/096140 A1 | 8/2009 |
| WO | 2010/113348 A1 | 10/2010 |

OTHER PUBLICATIONS

Nilsson et al., "Creating a secure infrastructure for wireless diagnostics and software updates in vehicles." Computer Safety, Reliability, and Security(2008): p. 207-220.*

European Search Report dated Apr. 24, 2015 in corresponding European Application No. 14186183.1-1954.

Japanese Office Action dated Dec. 8, 2015 in corresponding Japanese Patent Application No. 2013-217834.

Japanese Office Action dated Apr. 5, 2016 in corresponding Patent Application No. 2013-217834.

Chinese Office Action dated Oct. 26, 2016 in corresponding Chinese Patent Application No. 201410532506.7.

* cited by examiner

| VEHICLE ID /41 | CONSENT FLAG /42 | OWNER ID /43 | AUTHENTICATION METHOD /44 | AUTHENTICATION INFORMATION /45 |
|---|---|---|---|---|
| A | True | 3948A8C33 | FINGERPRINT | FINGERPRINT DATA 1 |
| A | True | 3948A8C34 | FINGERPRINT | FINGERPRINT DATA 2 |
| B | True | 9371855444A | VOICE | VOICE DATA 1 |
| C | True | C8D73772888 | IMAGE | IMAGE DATA 1 |
| D | False | - | - | - |

40

F I G. 4

| VEHICLE TYPE ID | MAXIMUM CAPACITY | BASIC ELECTRIC ENERGY | USABLE ELECTRIC ENERGY |
|---|---|---|---|
| A | A1 | B1 | C1 |
| B | A2 | B2 | C2 |
| C | A3 | B3 | C3 |
| D | A4 | B4 | C4 |

F I G. 5

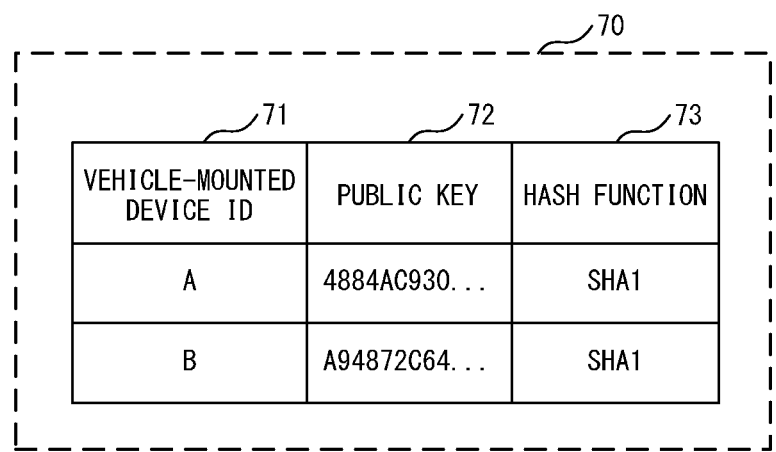
F I G. 7

APPARATUS AND METHOD FOR INSTALLING VEHICLE CORRECTION PROGRAM

CROSS-REFERENCE TO RELATED APPLICATION

This application is based upon and claims the benefit of priority of the prior Japanese Patent Application No. 2013-217834, filed on Oct. 18, 2013, the entire contents of which are incorporated herein by reference.

FIELD

The embodiments discussed herein are related to information processing method, and information processing apparatus.

BACKGROUND

As an example of an updating method for software of an information processing apparatus, there is a method in which the information processing apparatus acquires an update file from an update server connected via a network and applies the acquired software. As an example of a method of updating software via a network, there are, for example, first, second, and third techniques explained below.

In the first technique, a server includes approval information indicating whether a predetermined administrator permits rewriting of information of a built-in apparatus. When the built-in apparatus receives a rewriting request for information, the built-in apparatus transmits an approval confirmation request. The server returns a response to the approval confirmation request. Only when the built-in apparatus receives an approval confirmation response indicating permission, the built-in apparatus permits the rewriting of the information.

In the second technique, a method of authenticating a remote service with respect to a user via a communication network is disclosed. The remote service acquires a service authentication code generated on the basis of a first secret key using a code generation algorithm. The remote service transmits the service authentication code to the user via the communication network. The service authentication code is received by or input to an authentication device incidental to the user. Subsequently, the authentication device generates an expected code value on the basis of a second secret key using the same code generation algorithm and compares the expected code value with the service authentication code. According to the comparison, when the expected code value correlates with the service authentication code, the authentication device generates a response indicating genuineness of the remote service to the user.

In the third technique, a host (a computer for delivery) delivers a new module that executes service provision processing. A terminal updates an old module of a control program with the new module delivered by the host, executes operation verification processing for the updated new module, and, when an error is detected in the operation verification processing, executes error handling processing.

Patent Document 1: Japanese Laid-open Patent Publication No. 2013-37474

Patent Document 2: Japanese National Publication of International Patent Application No. 2008-524727

Patent Document 3: Japanese Laid-open Patent Publication No. 2004-326287.

SUMMARY

According to one aspect, a computer-readable recording medium having stored therein a program for causing a computer to execute a process comprising, receiving, from an automobile in which a control program for controlling devices mounted on the automobile operates, an update request concerning the control program, classifying a plurality of correction programs corresponding to the update request into a plurality of groups on the basis of usable electric energy of a battery corresponding to a vehicle type to which the automobile belongs, an amount of the usable electric energy being stored in a storage unit, and transmitting the classified correction programs to the automobile for each of the groups.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an example of the configuration of consent information;

FIG. 5 illustrates an example of the configuration of capacity management information according to the embodiment;

FIG. 7 illustrates an example of key management information for a security ensuring unit to manage a public key and a hash function;

DESCRIPTION OF EMBODIMENTS

When update target software operates in an automobile, it is conceivable that update of the software is performed in a stop state of the automobile to prevent the update from affecting the behavior of the automobile. Therefore, electric power used in the update of the software is supplied from a battery mounted on the automobile. However, the capacity of the battery mounted on the automobile is limited. When an update amount of the software is large, electric energy used in the update also large. As a result, large amount of electric power of the battery is consumed. The battery mounted on the automobile is also used during the start of the automobile. Therefore, when the large amount of electric power of the battery is consumed in the update of the software, for example, the automobile cannot be started.

Figure 1:
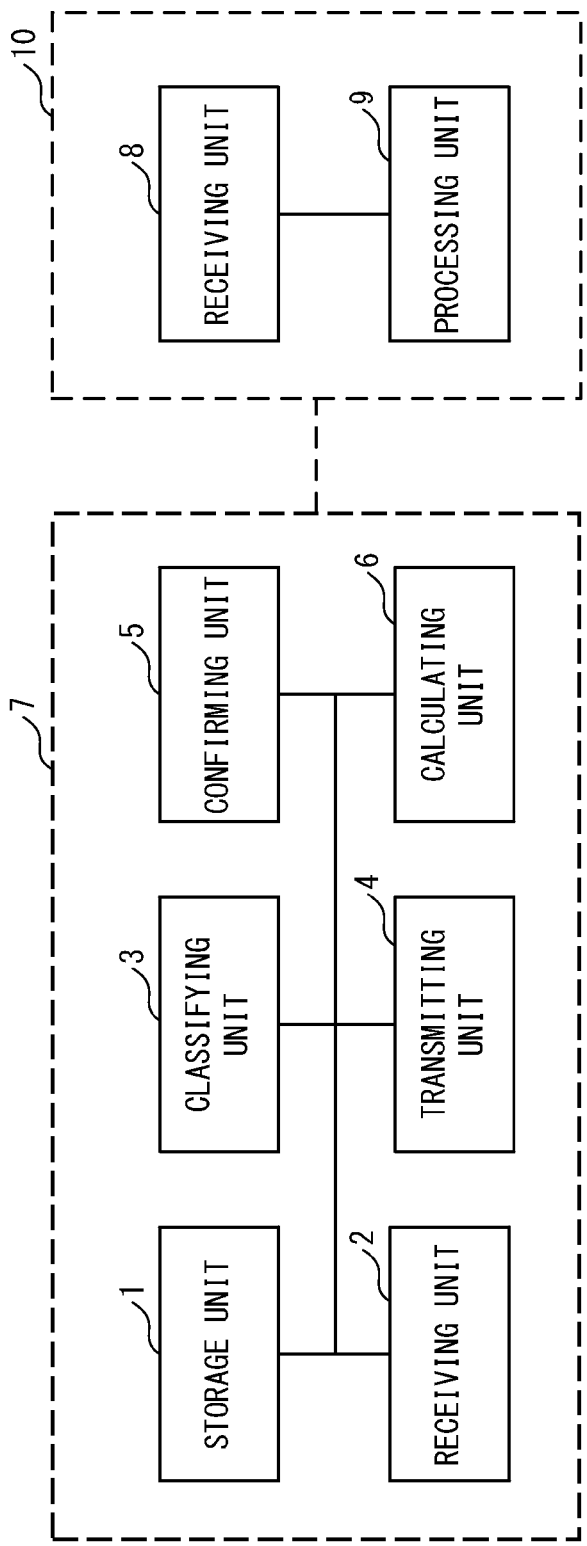
FIG. 1 is a functional block diagram illustrating the configuration of an information processing apparatus in an embodiment.

FIG. 1 is a functional block diagram illustrating the configuration of an information processing apparatus in an embodiment.

An information processing apparatus 7 includes a storage unit 1, a receiving unit 2, a classifying unit 3, a transmitting unit 4, a confirming unit 5, and a calculating unit 6.

The storage unit 1 stores amount of usable electric energy of a battery of an automobile in association with a vehicle type to which the automobile belongs.

The receiving unit 2 receives, from the automobile in which a control program for controlling devices mounted on the automobile operates, an update request concerning the control program.

The classifying unit 3 classifies, on the basis of the usable electric energy corresponding to the automobile in which the control program operates, a plurality of correction programs corresponding to the update request into a plurality of groups. The classifying unit 3 classifies the plurality of correction programs into a plurality of groups when a total value of expected power consumption used for installing a correction program for a control program in a control unit configured to execute the control program and mounted on the automobile is larger than the usable electric energy. The classifying unit 3 classifies the plurality of correction programs into groups, the number of which is determined on the basis of the total value of the power consumption and the usable electric energy.

The transmitting unit 4 transmits the classified correction programs to the automobile for each of the groups.

The confirming unit 5 receives confirmation information indicating whether the correction programs classified into a first group among the plurality of groups, into which the plurality of correction programs are classified, are normally received. Then, after confirming with the confirmation information that the correction programs classified into the first group are normally received, the transmitting unit 4 starts transmission of the correction programs classified into a second group among the plurality of groups.

The calculating unit 6 calculates a total value of power consumption on the basis of power consumption stored in the storage unit 1 in association with each control unit and used for installing a correction program of a unit size.

An information processing apparatus 10 includes a receiving unit 8 and a processing unit 9.

The receiving unit 8 receives correction programs, which are classified into a plurality of groups on the basis of usable electric energy of a battery corresponding to a vehicle type to which an installation target automobile belongs, for each of the groups.

The processing unit 9 installs the classified correction program for each of the groups according to a battery residual capacity of the installation target automobile. At timing when it is expected that the installation target automobile stops for a predetermined time or more, the processing unit 9 installs the correction programs classified into any one group among the plurality of groups. When the battery residual capacity of the installation target automobile is equal to or larger than a predetermined threshold, the processing unit 9 installs the correction programs classified into any one group among the plurality of groups.

Figure 2:
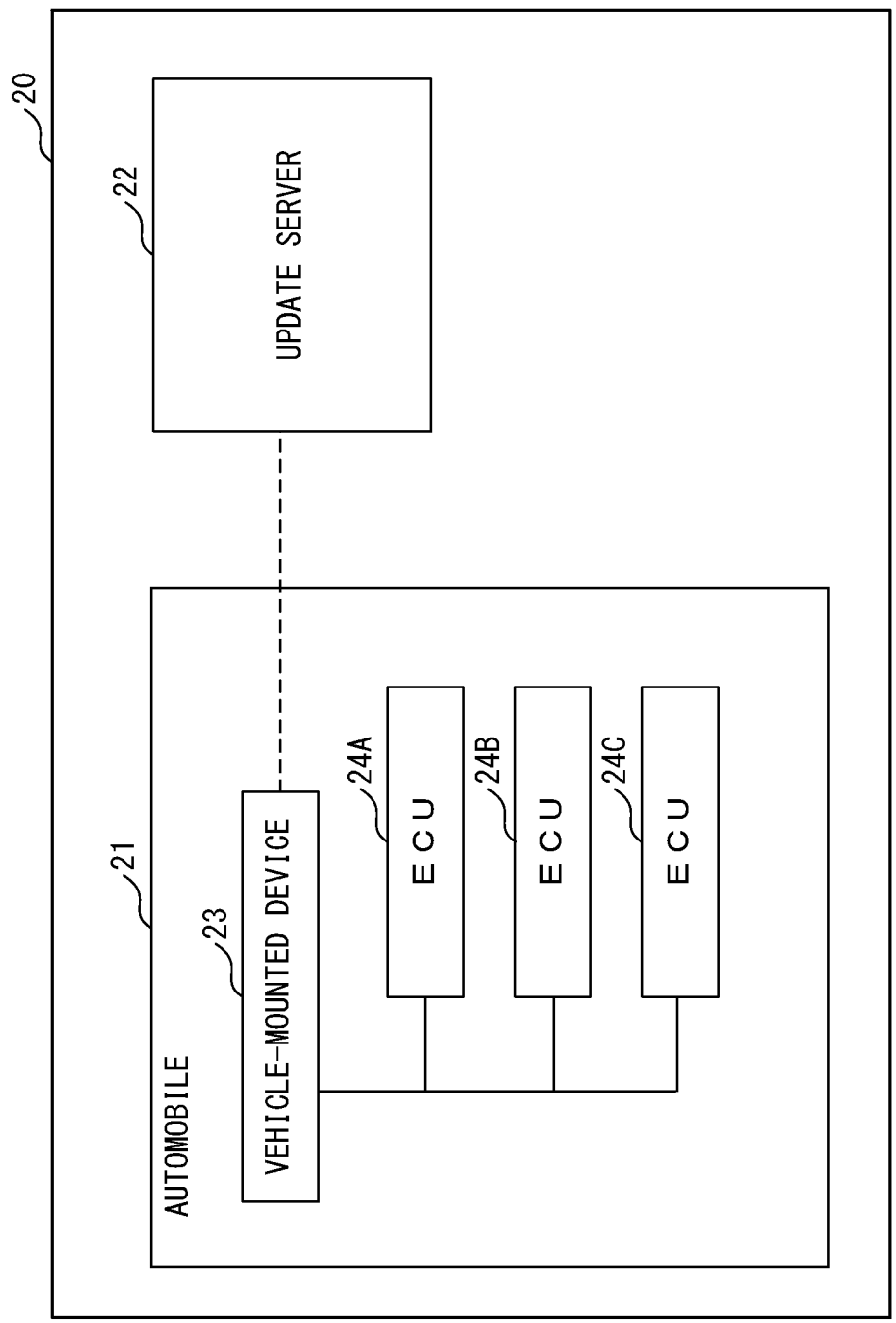
FIG. 2 illustrates an example of an update system for ECUs mounted on an automobile according to the embodiment.

FIG. 2 illustrates an example of an update system for Electric Control Units (ECUs) mounted on an automobile.

In FIG. 2, an update system 20 includes an automobile 21 and an update server 22. The automobile 21 includes a vehicle-mounted device 23 and ECUs 24A, 24B, and 24C. The update server 22 and the vehicle-mounted device 23 are connected via a network. The vehicle-mounted device 23 and the ECUs 24 are connected via a network or a bus. Examples of the network for connecting the update server 22 and the vehicle-mounted device 23 include a wireless network. Examples of the network for connecting the ECUs 24 and the vehicle-mounted device 23 include a Controller Area Network (CAN) and Flex Ray. In the following explanation, when the ECUs 24A, 24B, and 24C are not particularly distinguished, the ECUs 24A, 24B, and 24C are simply referred to as ECUs 24.

The update server 22 is an information processing apparatus that distributes update files of software operating on the ECUs 24 to the automobile 21. The update server 22 transmits the update files to the vehicle-mounted device 23 of the automobile 21 and, thereafter, receives configuration information of the ECUs 24 applied with the update files from the vehicle-mounted device 23. The update server 22 determines, on the basis of the received configuration information, whether update of files is successful.

The vehicle-mounted device 23 is a device capable of performing communication of information with the update server 22 via the network. The vehicle-mounted device 23 receives the update files from the update server 22 and instructs the ECUs 24 set as update targets to install (apply) the received update files. The vehicle-mounted device 23 collects configuration information indicating a state of the software operating on the ECUs 24 and transmits the configuration information to the update server 22. The vehicle-mounted device 23 is not particularly limited as long as the vehicle-mounted device 23 can communicate with the update server 22 and the ECUs 24. The vehicle-mounted device 23 may be a car navigation device, a smart phone that can be set in the automobile 21, and the like.

The ECUs 24 control a sensor system including various sensors used in control of an engine, the operation of the engine, and various devices mounted on the automobile. The ECUs 24 receive an installation instruction for update files from the vehicle-mounted device 23 and perform installation processing for the update files. When the installation processing for the update files is completed, the ECUs 24 acquire configuration information of the ECUs 24 and notify the vehicle-mounted device 23 of the configuration information. The update of the software is performed in two stages of the installation processing for the update file and enabling processing for the update file. Enabling of the update file is performed after an instruction for enabling of update is received from the update server 22. Note that the configuration information of the software is, for example, various parameters of the software. If the parameters are normal, it is guaranteed that the software is normal.

Note that the update file may be software of a form applied to defective software or may be software of a form for replacing software in which a deficiency is found. Specifically, for example, the update file is a patch of the software. Note that, when a deficiency is found in the automobile, it is sometimes preferable to install a plurality of update files to eliminate the deficiency. In the following explanation of this embodiment, on the assumption that a deficiency is found in software operating on ECUs mounted on an automobile, one or more update files for eliminating the deficiency are referred to as application target update files.

In the following explanation, receiving an update file from the update server 22 and performing application of the received update file in the automobile 21 is referred to as remote maintenance. An installation processing target vehicle is referred to as target vehicle.

Figure 3:
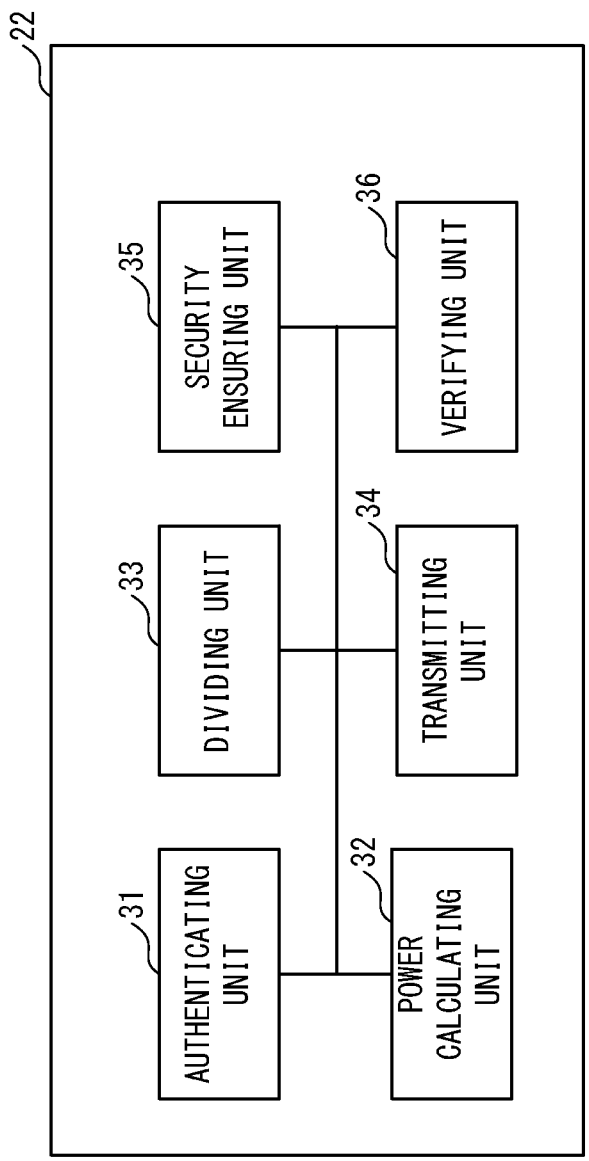
FIG. 3 illustrates an example of the configuration of an update server according to the embodiment.

The configuration of the update server 22 is explained. FIG. 3 illustrates an example of the configuration of the update server 22 according to this embodiment.

The update server 22 includes an authenticating unit 31, a power calculating unit 32, a dividing unit 33, a transmitting unit 34, a security ensuring unit 35, and a verifying unit 36.

The update server 22 is an example of the information processing apparatus 7. The authenticating unit 31 is an example of the receiving unit 2. The power calculating unit 32 is an example of the calculating unit 6. The dividing unit 33 is an example of the classifying unit 3. The transmitting unit 34 is an example of the transmitting unit 4 and the confirming unit 5.

Before the start of transmission processing and installation processing for update files, the authenticating unit 31 checks whether consent of an owner is obtained for remote maintenance of a target vehicle. The check concerning whether consent to the remote maintenance of the target vehicle from the owner is obtained includes a consent check performed using information registered in advance and a consent check performed by directly obtaining consent from the owner during the start of update work. Note that the check concerning whether consent to the remote maintenance of the target vehicle from the owner is obtained may be any one of the consent check performed using information registered in advance and the consent check performed by directly obtaining consent from the owner during the start of update work. The consent check performed using information registered in advance may be executed by the authenticating unit 31 when the authenticating unit 31 receives a check request from the vehicle-mounted device 23.

To check whether consent to the remote maintenance of the target vehicle from the owner is obtained, the authenticating unit 31 collects information for the consent check in advance and records the information in a predetermined storage area. Such information for the consent check is referred to as consent information.

FIG. 4 illustrates an example of the configuration of the consent information. In FIG. 4, consent information 40 includes a vehicle ID 41, a consent flag 42, an owner ID 43, an authentication method 44, and authentication information 45.

The vehicle ID 41 is identification information for uniquely identifying the automobile 21. The consent flag 42 is information indicating whether a vehicle indicated by the vehicle ID 41 obtains prior consent to remote maintenance from an owner of the vehicle. The owner ID 43 is identification information for uniquely identifying the owner who owns the vehicle indicated by the vehicle ID 41. Note that, concerning the owner ID 43, a plurality of persons can be registered for one vehicle. The authentication method 44 is information indicating a method in which the authenticating unit 31 authenticates the owner of the vehicle during the start of the update work. The authentication method 44 can be, for example, various methods of authentication and the like performed using a fingerprint, voice, or an image of the owner. The authentication information 45 is information used in the authentication by the authentication method 44 during the start of the update work.

Concerning the consent check performed using the information registered in advance, the authenticating unit 31 determines, referring to the consent information 40, whether the target vehicle of the remote maintenance obtains consent to the remote maintenance from the owner of the vehicle in advance. That is, the authenticating unit 31 extracts, from the consent information 40, a record of the vehicle ID 41 coinciding with identification information of the target vehicle. Subsequently, the authenticating unit 31 checks the consent flag 42 of the extracted record. If a value of the consent flag 42 is a value (e.g., "True") indicating that the vehicle obtains the prior consent to the remote maintenance, the authenticating unit 31 determines that the vehicle obtains the consent to the remote maintenance from the owner of the vehicle. On the other hand if the value of the consent flag 42 is a value (e.g., "False") indicating that the vehicle does not obtain the prior consent to the remote maintenance from the owner of the vehicle, the authenticating unit 31 determines that the consent to the remote maintenance is not obtained from the owner of the vehicle.

When determining that the prior consent to the remote maintenance of the target vehicle from the owner is obtained, the authenticating unit 31 performs the consent check performed by directly obtaining consent from the owner during the start of the update work.

That is, the authenticating unit 31 acquires consent confirmation information, which is information indicating that the owner consents to the remote maintenance, from the target vehicle. The consent confirmation information includes authentication information for confirming that the owner who consents to the remote maintenance is a true owner. The authentication information includes, for example, information concerning a fingerprint, voice, and an image (a face photograph) of the owner. The authenticating unit 31 extracts a record coinciding with the identification information of the target vehicle from the consent information 40 and compares the authentication information received from the target vehicle and a value of the authentication information 45 of the extracted record. When the authentication information received from the target vehicle and the value of the authentication information 45 of the extracted record coincide with each other, the authenticating unit 31 determines that consent to the remote maintenance is obtained from the true owner of the target vehicle. When the authentication information received from the target vehicle and the value of the authentication information 45 of the extracted record do not coincide with each other, the authenticating unit 31 determines that consent to the remote maintenance is not obtained from the true owner of the target vehicle. When determining that consent to the remote maintenance is obtained from the true owner of the target vehicle, the authenticating unit 31 stores the consent confirmation information received from the vehicle in a predetermined storage area as evidence.

In FIG. 4, a record is stored in which the vehicle ID 41 is "A", the consent flag 42 is "True", the owner ID 43 is "3948A8C33", the authentication method 44 is "fingerprint", and the authentication information 45 is "fingerprint data 1". This indicates that a vehicle, the vehicle ID 41 of which is "A", obtains the prior consent to the remote maintenance from the owner and an owner, the vehicle ID 41 of whom is "A", is an owner indicated by the owner ID 43 "3948A8C33". This also indicates that, during the start of the remote maintenance of the vehicle, the vehicle ID 41 of which is "A", authentication of the owner by "fingerprint authentication" is performed, fingerprint information input from the owner and information of "fingerprint data 1" are collated, and, when the fingerprint information and the information coincide with each other, it is determined that the authentication is successful.

In FIG. 4, a record is stored in which the vehicle ID 41 is "D", the consent flag 42 is "False", and the owner ID 43, the authentication method 44, and the authentication information 45 are "-". This indicates that a vehicle, the vehicle ID 41 of which is "D", does not obtain the prior consent to the remote maintenance from the owner. Therefore, concerning the vehicle, the vehicle ID 41 of which is "D", the remote maintenance processing is not performed.

Note that, after it is confirmed that the consent to the remote maintenance of the target vehicle from the owner is obtained, transmission of the update file to the target vehicle is performed. Therefore, the consent confirmation information including indication that the owner consents to the remote maintenance can also be grasped as a delivery request for the update file from the owner.

The power calculating unit 32 calculates power consumption of installation processing for all application target update files in the target vehicle. The power calculating unit 32 compares the calculated power consumption with electric energy of a battery of the target vehicle usable for installing the update files. According to the comparison, the power calculating unit 32 determines whether update processing for all the update files can be carried out at a time.

Specifically, the power calculating unit 32 stores in advance, for each vehicle type, in a predetermined storage area, the amount of usable electric energy, which is the amount of maximum electric energy usable for installing the update files, in the capacity of the battery.

For example, since the battery mounted on the vehicle is used in the start of the engine, not all the capacity of the battery can be used for the update processing for the update files. Therefore, the power calculating unit 32 stores, as a policy, the amount of electric energy usable for the installation processing for the update files in the capacity of the battery. Information for the power calculating unit 32 to manage, for each vehicle type, the electric energy usable for the installation processing for the update files in the capacity of the battery is referred to as capacity management information in the following explanation. FIG. 5 illustrates an example of the configuration of the capacity management information according to this embodiment.

Capacity management information 50 includes data items of a vehicle type ID 51, a maximum capacity 52, basic electric energy 53, and usable electric energy 54. The vehicle type ID 51 is identification information for uniquely identifying a vehicle type. The maximum capacity 52 is information indicating a maximum capacity of a battery mounted on the vehicle indicated by the vehicle type ID 51. The basic electric energy 53 is information indicating a residual capacity of the battery that has to be at least secured for use in, for example, the start of an engine in the capacity of the battery mounted on the vehicle type indicated by the vehicle type ID 51. The usable electric energy 54 is information indicating maximum electric energy usable for installation of the update files in the capacity of the battery mounted on the vehicle type indicated by the vehicle type ID 51. The usable electric energy 54 can be, for example, a value of 1/n (n is a positive integer) of a value obtained by subtracting the basic electric energy 53 from the maximum capacity 52 of the battery.

Note that, in the following explanation, the residual capacity of the battery that has to be at least secured for use in, for example, the start of the engine is referred to as basic electric energy.

The power calculating unit 32 stores in advance, in a predetermined storage area, a value of power consumption of the installation processing for the update files for each unit size in association with the ECUs 24. Information for managing the value of the power consumption of the update processing for the update files in each unit size associated with each of the ECUs 24 is referred to as power consumption information in the following explanation. The power consumption information is used for calculating power consumption of the update of the update files of the target vehicle. The power consumption is managed in association with each of the ECUs 24 in this way because there is an individual difference in processing abilities of the ECUs 24 and the power consumption of updating the update files per unit size is also different.

Figure 6:
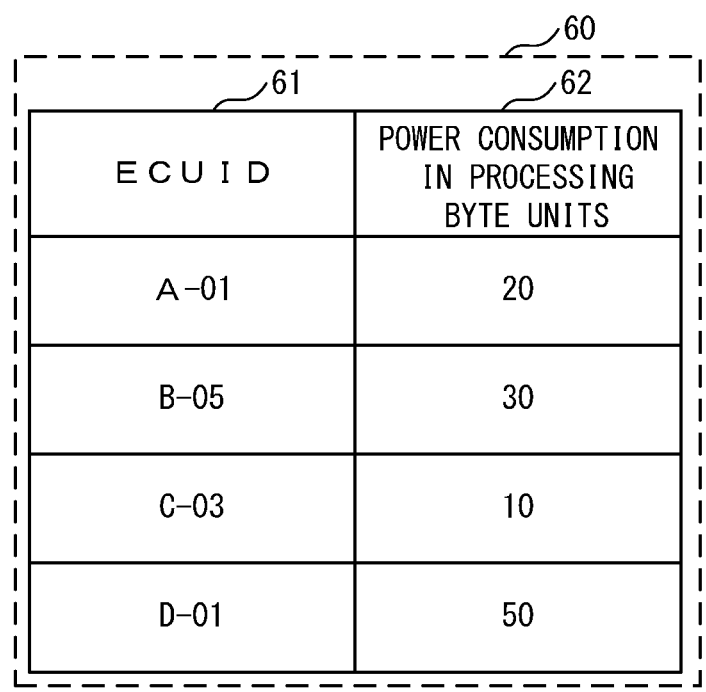
FIG. 6 illustrates an example of power consumption information.

FIG. 6 illustrates an example of the power consumption information. Power consumption information 60 includes an ECU ID 61 and power consumption in processing byte units 62. The ECU ID 61 is identification information for uniquely identifying the ECUs 24. The power consumption in processing byte units 62 is information indicating electric energy consumed in the installation processing for the update files of, for example, 1 Kbyte in the ECUs 24 indicated by the ECU ID 61.

In the calculation of the power consumption of the installation processing for all the update files of the target vehicle, first, the power calculating unit 32 calculates, on the basis of the power consumption information 60 and the size of the update files, power consumption of the installation processing for the update files. Specifically, the power calculating unit 32 extracts a record of the ECU ID 61 of the ECUs 24, on which the update files operate, in the power consumption information 60 and acquires a value of the power consumption in processing byte units 62 of the extracted record. The power calculating unit 32 multiplies the size of the update files with the acquired value of the power consumption in processing byte units 62 to calculate electric energy consumed by the installation processing for the update files. In this way, concerning all the update files included in the ECUs 24, the power calculating unit 32 calculates power consumption of the installation processing. The power calculating unit 32 totals the calculated power consumption of all the update files included in the ECUs 24 to calculate power consumption of the installation processing for all the update files of the target vehicle. In the following explanation, a total value of the power consumption of the installation processing for all the update target files is referred to as update total power consumption.

As explained above, the power calculating unit 32 calculates the update total power consumption, acquires the usable electric energy corresponding to the vehicle type of the target vehicle referring to the capacity management information 50, and compares the calculated update total power consumption and the acquired usable electric energy.

When the power calculating unit 32 determines that the update total power consumption is larger than the usable electric energy, the dividing unit 33 divides (classifies) the plurality of application target update files into a plurality of groups.

Specifically, the dividing unit 33 divides (classifies) the update files into groups, the number of which is equivalent to a value obtained by dividing the update total power consumption by the usable electric energy of the battery of the target vehicle (digits after a decimal point are rounded up). For each of the groups classified (divided) in this way, in the target vehicle, control is performed to apply the update files. After the completion of the installation processing for one group, control is performed to charge the battery and perform the installation processing for the next group. Consequently, it is possible to prevent the battery from being exhausted in the installation processing.

The dividing unit 33 divides (classifies) the update files such that the update files having a dependency relation are included in the same group. The files having the dependency relation indicate files in which, when one file is updated, the other is better to be simultaneously updated, among a group of the update files. A group of the update files having the dependency relation includes, for example, certain software and software that receives an output value of the software as an input.

If the files having the dependency relation are prevented from belonging to two or more groups, it is possible to sequentially perform the update processing for each of the groups and perform enabling of update in order from the group for which the update processing is ended.

However, depending on a relation among the update files and the usable electric energy of the battery, it is also likely that the files having the dependency relation belong to two or more groups. In this case, the plurality of groups including the plurality of files having the dependency relation are controlled such that enabling of update is performed at the same timing. Consequently, it is possible to prevent a deficiency that occurs when the vehicle starts in a state in which only a part of the update files having the dependency relation is applied.

The transmitting unit 34 transmits the update files to the vehicle-mounted device 23 of the target vehicle. When the division (the classification) of the update files is performed by the dividing unit 33, the transmitting unit 34 transmits the update files to the target vehicle for each divided (classified) group. Since the update files are divided and transmitted for each of the groups, the vehicle mounted device 23 that receives the update files can easily perform installation of the update files for each of the groups. Therefore, it is possible to reduce a load applied to processing for preventing the battery from being exhausted in the vehicle-mounted device 23.

The transmitting unit 34 confirms that the transmitted update files are correctly received by the vehicle mounted device 23. In the following explanation, processing for confirming that the transmitted update files are correctly received by the vehicle-mounted device 23 is referred to as transmission processing status confirmation.

In the transmission processing status confirmation, the transmitting unit 34 receives, from the vehicle-mounted device 23, notification indicating whether the transmitted update files are correctly received and checks the notification to thereby determine that that the transmitted update files are correctly received by the vehicle-mounted device 23.

Specifically, processing on the vehicle-mounted device 23 side is explained below. The vehicle-mounted device 23 confirms, using a digital signature or the like, that the received files can be correctly received. The vehicle-mounted device 23 notifies the update server 22 of status information including information concerning whether the files are correctly received and identification information of files that cannot be correctly received. The transmitting unit 34 receives the status information and refers to contents of the status information. When a file cannot be correctly received by the vehicle-mounted device 23, the transmitting unit 34 performs retransmission of the file. Concerning the files that can be confirmed as being correctly received by the vehicle-mounted device 23, the transmitting unit 34 determines that the transmission processing for the files is completed.

When determining that the transmission processing for all the files included in the group is completed, the transmitting unit 34 transmits, to the vehicle-mounted device 23, transmission completion notification indicating that the transmission processing for the group is completed. Thereafter, the transmitting unit 34 transmits the update files included in the next un-transmitted group to the vehicle-mounted device 23.

Note that, concerning timing of the transmission of the update files, the transmitting unit 34 may transmit the update files after confirming that the engine of the target vehicle is started. That is, before transmitting the update files, the transmitting unit 34 transmits, to the vehicle-mounted device 23, an inquiry concerning whether the engine of the target vehicle is started. As a response to the inquiry from the vehicle-mounted device 23, the transmitting unit 34 receives information concerning whether the engine is started. When the engine is started, the transmitting unit 34 may transmit the update files. When the engine is stopped, the vehicle-mounted device 23 may further inquire the vehicle-mounted device 23 about a residual capacity of the battery. When the residual capacity of the battery is equal to or larger than a predetermined threshold, the transmitting unit 34 may transmit the update files. Note that the predetermined threshold may be, for example, a value obtained by adding the basic electric energy to electric energy consumed in download processing.

If the engine is started, since power generation is performed by the rotation of the engine, sufficient electric power is supplied. The transmitting unit 34 transmits the update files after confirming that the engine of the target vehicle is started. Therefore, the electric power generated by the rotation of the engine may be used as electric power in the download processing in the target vehicle. When the engine is stopped, the transmitting unit 34 transmits the update files when a battery residual capacity of the target vehicle is equal to or larger than the predetermined threshold. Therefore, it is possible to prevent exhaustion of the battery of the vehicle due to the download processing.

The verifying unit 36 verifies whether the update files are correctly installed (applied). For the verification, the verifying unit 36 records in advance, in a predetermined storage area, correct configuration information in the case of correct installation of the update files. In the following explanation, the correct configuration information in the case of correct installation of the update files is referred to as white list. The white list is, for example, configuration information obtained by verification performed using a verifier, an actual machine, or the like that reproduces an environment of the target vehicle.

The verifying unit 36 acquires configuration information after the installation of the update file from the vehicle-mounted device 23, compares the acquired configuration information and the white list, and determines whether the installation of the update files is successful. When determining that the update of the software is unsuccessful, the verifying unit 36 instructs the vehicle-mounted device 23 to retry the installation processing for the update files. On the other hand, when determining that the update of the software is successful, the verifying unit 36 notifies the vehicle-mounted device 23 that the installation of the update files is successful.

Note that, when determining that the update of the software is unsuccessful, the verifying unit 36 may instruct the vehicle-mounted device 23 to roll back the installation processing for the update files.

When the verifying unit 36 confirms that the installation of all the application target update files is successful, the verifying unit 36 notifies the vehicle-mounted device 23 that the installation of the application target update files is successful.

Note that, when the files having the dependency relation are not included between the groups, it is also possible to confirm that the installation is successful in units of groups not including the files having the dependency relation and notifies the vehicle-mounted device 23 that the installation of the application target update files is successful. For example, when a plurality of update files having a dependency relation do not belong to a plurality of groups, every time the verifying unit 36 confirms that the installation of all the update files included in the groups is successful, the verifying unit 36 may notify the vehicle-mounted device 23 that the installation of the application target update files is successful. In this case, if consent confirmation for enabling of the update files from the owner is performed and consent is confirmed by the vehicle-mounted device 23 that receives the notification that the installation of the application target update files is successful, enabling of the update files is performed. That is, when there is no influence by the dependency relation of the update files, it is possible to perform, without waiting for the installation processing for all the application target update files to be completed, enabling of the groups from the update files of the groups in which the success of the installation is confirmed.

The security ensuring unit 35 provides a mechanism for ensuring security of communication between the update server 22 and the vehicle-mounted device 23.

In this embodiment, encryption and a digital signature are used in order to ensure security of the communication between the update server 22 and the vehicle mounted device 23. A pair of a public key and a secret key for the digital signature is generated for each combination of an update server and a vehicle-mounted device. A key pair of the vehicle-mounted device is generated during shipment of vehicles. Encryption target data is encrypted by a public key of a partner and decrypted by an own secret key. The digital signature is performed by signature by own secrete keys respectively retained by the update server and the vehicle-mounted device. Therefore, a plurality of the pairs of the public key and the secret key are present. As a first pair (a key pair of the update server), the update server 22 retains a secret key of the update server 22 and the vehicle-mounted device 23 retains a public key of the update server 22. As a second pair (a key pair of the vehicle-mounted device), the vehicle-mounted device 23 retains a secret key of the vehicle mounted device 23 and the update server 22 retains a public key of the vehicle-mounted device 23.

As the key pair of the vehicle-mounted device 23, a key pair created by Trusted Platform Modules (TPMs) included in vehicle-mounted devices 23 may be used.

The security ensuring unit 35 of the update server 22 retains the secret key of the update server 22. The update server 22 manages, for each vehicle-mounted device, the public key of the vehicle-mounted device 23 and a hash function used in comparison of transmission data and a digital signature. FIG. 7 illustrates an example of key management information 70 for the security ensuring unit 35 to manage the public key of the vehicle-mounted device 23 and the hash function. The key management information 70 includes data items of a vehicle-mounted device ID 71, a public key 72, and a hash function 73. The vehicle-mounted device ID 71 is identification information for uniquely identifying the vehicle-mounted device 23. The public key 72 is information concerning the public key of the vehicle-mounted device 23 identified by the vehicle-mounted device ID 71. The public key 72 corresponds to a secret key of the vehicle-mounted device 23 identified by the vehicle-mounted device ID 71. The hash function 73 is a hash function used for comparing transmission data and a digital signature. As the hash function 73, the same hash function is stored in the vehicle-mounted device 23 identified by the vehicle-mounted device ID 71. The key management information 70 is registered during the shipment of the vehicles.

As an example of a method of authentication of the vehicle-mounted device 23 and check of confidentiality of data from the vehicle-mounted device 23 by the security ensuring unit 35, a method of authenticating the vehicle-mounted device 23 and checking confidentiality of data from the vehicle-mounted device 23 using a digital signature is explained. Note that the method of authentication and check of confidentiality is not limited to the method of authenticating the vehicle-mounted device 23 and checking confidentiality of data from the vehicle-mounted device 23 using the digital signature explained below. Various methods may be used. An example is explained below in which data transmitted and received between the security ensuring unit 35 and the vehicle-mounted device 23 is encrypted.

In the authentication, first, the vehicle-mounted device 23 calculates a hash value of transmission target data using the hash function stored in the vehicle-mounted device 23. Subsequently, the vehicle-mounted device 23 encrypts the calculated hash value using the own secret key and creates a digital signature. The vehicle-mounted device 23 encrypts the created digital signature and the transmission target data using the public key of the update server 22. The vehicle-mounted device 23 transmits the encrypted transmission data and the encrypted digital signature to the update server 22.

When receiving the encrypted transmission target data and the encrypted digital signature from the vehicle-mounted device 23, the security ensuring unit 35 decrypts the received information using the secret key of the update server 22. Subsequently, the security ensuring unit 35 acquires the public key 72 of the vehicle-mounted device 23 from the key management information 70, decrypts the digital signature with the public key 72, and acquires the hash value. The security ensuring unit 35 acquires the hash function 73 corresponding to the vehicle-mounted device 23 from the key management information 70 and calculates the hash value of the transmission target data using the acquired hash function 73. The security ensuring unit 35 compares the calculated hash value and the hash value obtained by decrypting the digital signature. When the hash values coincide with each other, the security ensuring unit 35 determines that the vehicle-mounted device 23 is the proper vehicle-mounted device 23 and determines that the data received from the vehicle-mounted device is not tampered. When the hash values do not coincide with each other, the security ensuring unit 35 requests the vehicle-mounted device 23 to retransmit the transmission data.

Note that, concerning the encryption of the data transmitted and received between the security ensuring unit 35 and the vehicle-mounted device 23, a hybrid encryption system obtained by combining common key encryption and public key encryption may be used or various methods may be used.

In this way, the security ensuring unit 35 of the update server 22 confirms that the authentication of the vehicle-mounted device 23 and the information received from the vehicle-mounted device 23 are not tampered.

The data transmitted from the update server 22 to the vehicle-mounted device 23 of the target vehicle is added with a digital signature by the security ensuring unit 35 before the transmission, encrypted, and transmitted. The transmission data includes update files transmitted to the vehicle-mounted device 23 by the transmitting unit 34.

Figure 8:
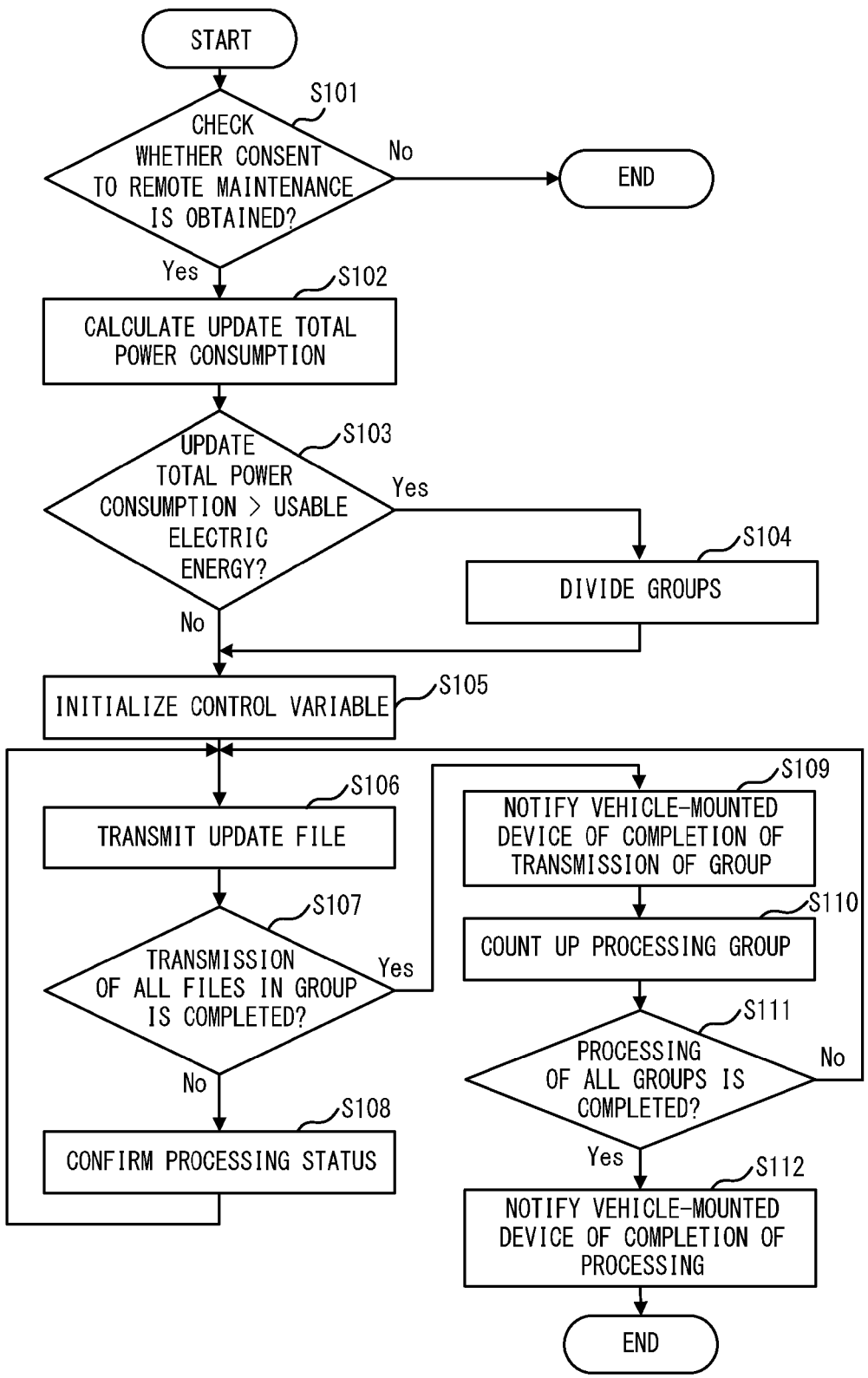
FIG. 8 is a flowchart illustrating an operation flow of transmission processing for update files in an update server.

FIG. 8 is a flowchart illustrating an operation flow of the transmission processing for the update files in the update server 22.

In FIG. 8, first, the authenticating unit 31 checks whether consent to the remote maintenance of the target vehicle from the owner is obtained (S101). When the authenticating unit 31 determines that the consent to the remote maintenance of the target vehicle from the owner is not obtained (No in S101), the processing ends.

When the authenticating unit 31 determines in S101 that the consent to the remote maintenance of the target vehicle from the owner is obtained (Yes in S101), the power calculating unit 32 calculates a total value of power consumption of the installation processing for all the update target files as update total power consumption (S102). The power calculating unit 32 compares the update total power consumption and the usable electric energy and determines whether the update total power consumption is larger than the usable electric energy, which is the maximum electric energy usable for the installation of the update files, in the capacity of the battery of the target vehicle (S103). When the power calculating unit 32 determines that the update total power consumption is equal to or smaller than the usable electric energy (No in S103), the processing transitions to S105.

On the other hand, when the power calculating unit 32 determines in S103 that the update total power consumption is larger than the usable electric energy (Yes in S103), the dividing unit 33 divides the update files (S104).

Subsequently, the transmitting unit 34 performs initialization processing for a control variable for transmission control (S105). For explanation, the number of the divided groups is represented as N and numbers are allocated in ascending order from 1 for each of the groups. A control variable n indicating a group number of a group set as a transmission target by the transmitting unit 34 in step S106 is defined and n is initialized by 1. Note that, when the division of the update files is not performed, a value of N is 1.

The transmitting unit 34 transmits the update file included in the group, the group number of which is the variable n, to the vehicle-mounted device 23 (S106).

The transmitting unit 34 determines whether the transmission of all the update files included in the group, the group number of which is the variable n, is completed (S107). When determining that the transmission of any one of the files included in the group, the group number of which is the variable n, is not completed (No in S107), the transmitting unit 34 performs confirmation of a transmission processing status (S108). The processing returns to S106. The transmitting unit 34 transmits, to the vehicle-mounted device 23, the update file, the transmission of which is not completed, among the files included in the group, the group number of which is the variable n.

When determining in S107 that the transmission of all the update files included in the group, the group number of which is the variable n, is completed (Yes in S107), the transmitting unit 34 notifies the vehicle-mounted device 23 of the completion of the transmission of the group, the group number of which is the variable n (S109). The transmitting unit 34 increments a value of the variable n (S110).

Subsequently, the transmitting unit 34 determines whether the transmission processing for all the groups is completed (S111). That is, the transmitting unit 34 determines whether a value of n is larger than N. When the transmitting unit 34 determines that the transmission processing for any one of the groups is not completed (No in S111), that is, when the value of n is equal to or smaller than N, the processing transitions to S106.

On the other hand, when determining in S111 that the transmission processing for all the groups is completed (Yes in S111), that is, when the value of n is larger than N, the transmitting unit 34 determines that the transmission processing for all the groups is completed. The transmitting unit 34 notifies the vehicle-mounted device 23 that the transmission processing for all the transmission target update files is completed (S112). Then, the processing ends.

The installation processing for the update files in the automobile 21 is explained.

The installation processing for the update files is carried out in a state in which the target vehicle is stopped. Therefore, in this embodiment, a history of periods of time when the target vehicle is in the stopped state is recorded and a period of time when the vehicle is expected to stably stop is predicted from the history. When the vehicle stops in the period of time when the vehicle is expected to stably stop, control is performed to start the installation processing for the update files. Before the start of the installation processing for the update files, it is determined whether a residual capacity of the battery at that point in time is sufficient for performing the installation processing.

Further, the installation processing for the update files is performed in units of one group divided by the dividing unit 33. After the installation processing for the one group, the installation processing for the next group is started after it is confirmed that charging of the battery is carried out. Therefore, in some case, it takes a few days to complete the installation processing for a plurality of groups. For example, when there are three groups and the charging is performed only once in one week, it sometimes takes at least two weeks and one day for the installation processing for all the files.

Note that the download processing for the update files from the update server 22 and the installation processing for the update files are separated in terms of time. The download processing for the update files often consumes more electric power than the installation processing. However, it is possible to reduce exhaustion of the battery by performing, after the download processing, the installation processing after the battery is charged.

Figure 9:
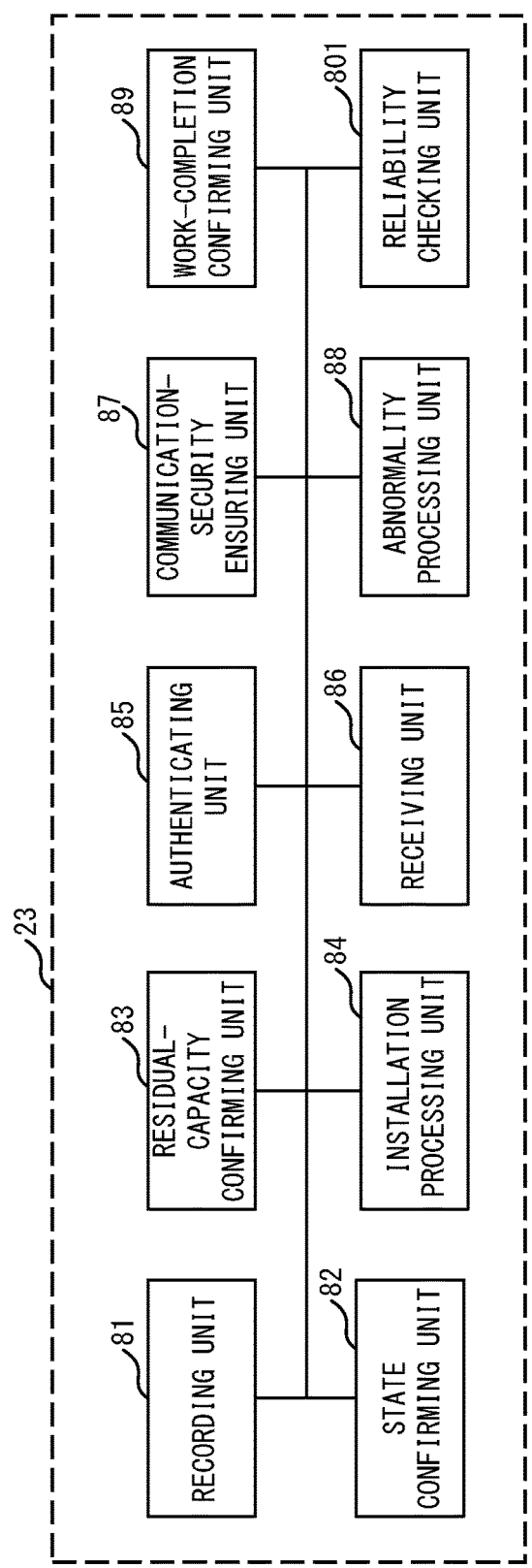
FIG. 9 illustrates an example of the configuration of a vehicle-mounted device.

FIG. 9 illustrates an example of the configuration of the vehicle-mounted device 23.

The vehicle mounted device 23 includes a recording unit 81, a state confirming unit 82, a residual-capacity confirming unit 83, an installation processing unit 84, an authenticating unit 85, a receiving unit 86, a communication-security ensuring unit 87, an abnormality processing unit 88, a work-completion confirming unit 89, and a reliability checking unit 801.

The vehicle-mounted device 23 is an example of the information processing apparatus 10. The receiving unit 86 is an example of the receiving unit 8. The installation processing unit 84 is an example of the processing unit 9.

The recording unit 81 records history information of periods of time when the target vehicle stops. In the following explanation, the history information of the stop periods of time of the target vehicle recorded by the recording unit 81 is referred to as vehicle history information.

Figure 10:
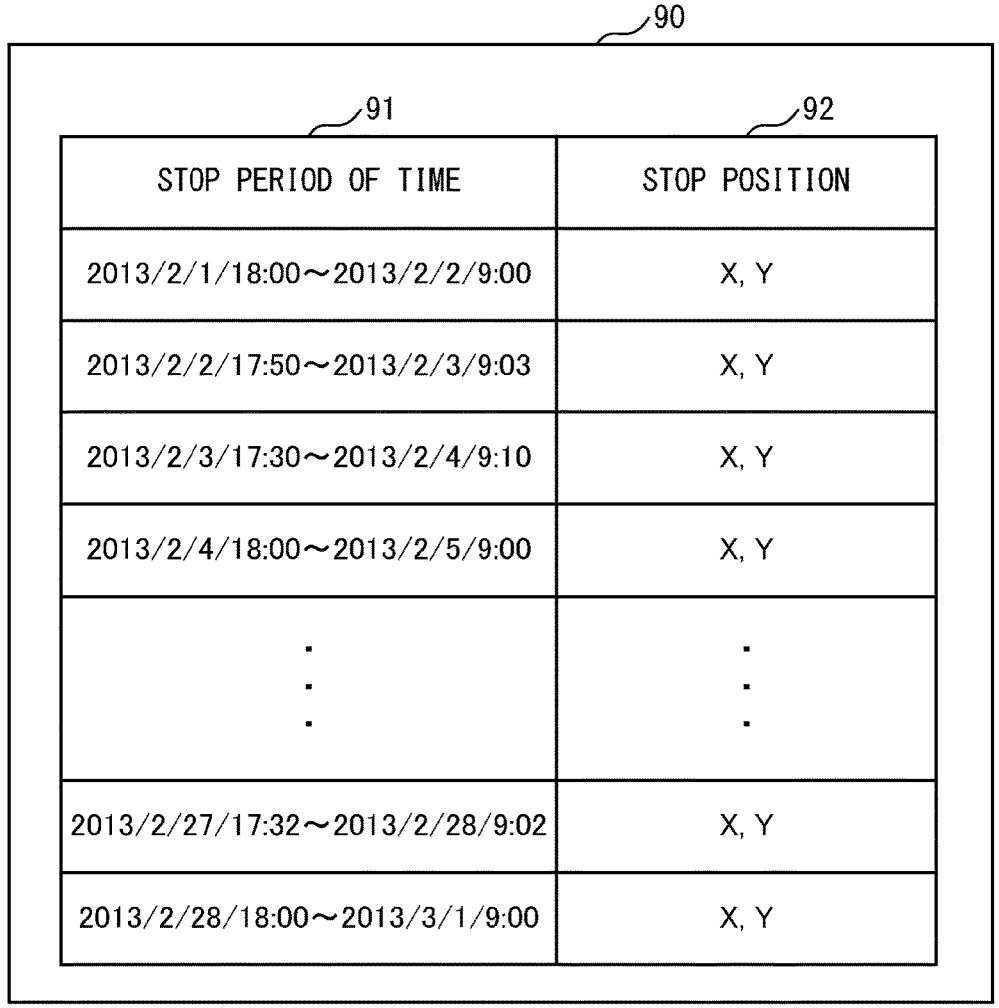
FIG. 10 illustrates an example of the configuration of vehicle history information.

Specifically, the recording unit 81 stores, in a predetermined storage area, stop periods of time and stop positions of the vehicle in a certain period of time as vehicle stop history information. FIG. 10 illustrates an example of the configuration of the vehicle history information.

Vehicle history information 90 includes data items of a stop period of time 91 and a stop position 92. The stop period of time 91 is information indicating stop periods of time of the target vehicle. The stop position 92 is information indicating positions of the target vehicle in the periods of time indicated by the stop period of time 91.

When the vehicle stops, the recording unit 81 stores time when the vehicle stops and position information of the vehicle at that point respectively in the stop period of time 91 and the stop position 92 of the vehicle history information 90. For example, the recording unit 81 may record stop time immediately before the vehicle stops, record start time when the vehicle is started next time, calculate a stop period of time from the recorded stop time and start time, and record the stop period of time in the stop period of time 91. The recording unit 81 may measure a position of the vehicle at stop time or start time using, for example, a Global Positioning System (GPS) mounted on the vehicle and store a result of the measurement in the stop position 92.

The state confirming unit 82 determines whether the target vehicle is stopped in a period of time when the target vehicle is expected to stably stop.

Specifically, first, the state confirming unit 82 specifies, referring to the vehicle history information 90, a period of time when the vehicle periodically stops in a predetermined place. For example, the state confirming unit 82 specifies, referring to the vehicle history information 90, a pattern in which a period of time when the vehicle stops in the predetermined position in a certain period of time such as one month. In the vehicle history information 90 illustrated in FIG. 10, for example, it is recorded that the vehicle is periodically stops in a "coordinate X, Y" in a period of "18:00 to 9:00". Therefore, the state confirming unit 82 determines that the vehicle periodically stops in the "coordinate X, Y" in the period of "18:00 to 9:00".

Note that it is assumed that a period of time determined as the period of time when the vehicle periodically stops is, for example, equal to or longer than a predetermined time width such as five hours. When a value of the predetermined time width is represented as α, α is stored in a predetermined storage area in advance. α may be calculated on the basis of time of installing a file for each of the groups of the update files. For example, α may be set to a value larger than time for installing all the update files included in one group.

The state confirming unit 82 determines whether the vehicle is stopped in the period of time and the coordinate in which the vehicle is determined as periodically stopping. In the following explanation, a state in which the vehicle is stopped in the period of time and the coordinate in which the vehicle is determined as periodically stopping is referred as stable stop state of the vehicle. Note that, since a stop position of the vehicle is likely to slightly shift, a coordinate in which the stop position is determined as the same may be given predetermined latitude.

The residual-capacity confirming unit 83 checks whether a present residual capacity of the battery of the target vehicle is sufficient for performing the installation processing. Specifically, the residual-capacity confirming unit 83 determines whether the present residual capacity of the battery of the target vehicle is equal to or larger than an added-up value of the usable electric energy, the basic electric energy, and a predetermined margin value. Note that the predetermined margin value may be 0. The usable electric energy and the basic electric energy may be acquired from the capacity management information 50 of the update server 22 by the residual-capacity confirming unit 83. Note that the present residual capacity of the battery can be estimated according to values of a voltage drop and internal resistance at the time when a power load is applied.

Before the execution of the installation processing for the respective files included in the target group, the residual-capacity confirming unit 83 determines whether the voltage of the battery is normal. Specifically, the residual-capacity confirming unit 83 determines whether the voltage of the battery is within a range of a normal value stored in a predetermined storage area in advance. By determining whether the battery voltage is normal before the installation processing for the update files, when a residual capacity of the battery decreases because of an unexpected factor other than the installation processing, it is possible to prevent the installation processing from being executed. For example, a change in the capacity of the battery due to temperature, an unexpected start of the engine, and the like are examples of the unexpected factor.

The installation processing unit 84 executes the installation processing for the update files. That is, the installation processing unit 84 transmits the update files received from the update server 22 to the ECUs 24 set as an application target of the update files and instructs the ECUs 24 to carry out the installation processing for the update files. When receiving completion notification of the installation of the update files from the instructed ECUs 24, the installation processing unit 84 transfers the completion notification of the installation to the update server 22. The ECUs 24 include configuration information after the installation processing in the completion notification of the installation. The verifying unit 36 of the update server 22 checks, using the configuration information, whether the installation is successful. When the verifying unit 36 determines that the installation is unsuccessful, the installation processing unit 84 receives a retry instruction (or a rollback instruction) for the installation from the verifying unit 36. Then, the installation processing unit 84 instructs the ECUs 24 to retry (or roll back) the installation. When the verifying unit 36 determines that the installation is successful, the installation processing unit 84 receives, from the verifying unit 36, notification to the effect that the installation of the update files is successful.

The authenticating unit 85 checks whether consent to the remote maintenance of the target vehicle from the owner is obtained.

That is, first, the authenticating unit 85 requests the update server 22 to check whether there is prior consent of the owner to the remote maintenance of the target vehicle. When receiving notification to the effect that there is the prior consent of the owner to the remote maintenance of the target vehicle, the authenticating unit 85 acquires consent of the owner in starting the installation of the update files.

In the acquisition of the consent of the owner in starting the installation, the authenticating unit 85 acquires authentication information by an authentication method registered in advance by the owner. For example, when the authentication method registered in advance is fingerprint authentication (vein authentication), the authenticating unit 85 outputs a message for urging an input of a fingerprint to the owner and acquires a fingerprint of the owner via a predetermined input device (e.g., a fingerprint sensor). For example, when the authentication method registered in advance is voice authentication, the authenticating unit 85 outputs a message for urging an input of voice to the owner and acquires voice of the owner via a predetermined input device (e.g., a microphone). For example, when the authentication method registered in advance is image authentication, the authenticating unit 85 outputs a message to the effect that acquisition of an image is performed to the owner and acquires an image of the owner via a predetermined input device (e.g., a camera). Note that the authentication method corresponds to the authentication method 44 of the consent information 40 managed by the update server 22. The authentication method may be stored in a predetermined storage area of the vehicle-mounted device 23 in advance or may be acquired from the update server 22 before acquisition of consent of the owner in starting the remote installation.

Subsequently, the authenticating unit 85 includes the authentication information acquired from the owner in the consent confirmation information and transmits the authentication information to the update server 22. The authenticating unit 85 receives an authentication result from the update server 22. The authenticating unit 85 checks the received authentication result and checks a result concerning whether the authentication is successful. When confirming that the authentication is unsuccessful, the authenticating unit 85 determines that consent to the remote maintenance from the owner is not obtained. When confirming that the authentication is successful, the authenticating unit 85 determines that the consent to the remote maintenance from the owner is obtained.

The receiving unit 86 receives the update files transmitted from the transmitting unit 34 of the update server 22. As explained above, the update files are transmitted from the transmitting unit 34 for each divided (classified) group. The receiving unit 86 receives the update files for each divided (classified) group and stores the received update files in a predetermined storage area for each divided (classified) group.

The receiving unit 86 determines whether all the update files included in a predetermined group divided (classified) by the update server 22 are already received.

The determination concerning whether all the update files included in the divided (classified) group are already received is performed by the receiving unit 86 checking whether transmission completion notification for each of the groups is received from the update server 22. When the transmission completion notification for each of the groups is received, the receiving unit 86 determines that all the update files included in the group are already received.

When determining that not all the update files included in the target group are already received, the receiving unit 86 transmits a transmission request for the update files to the update server 22. When there is an unsuccessfully received file, the receiving unit 86 may designate the unsuccessfully received file and transmit the transmission request for the file to the update server 22.

The communication-security ensuring unit 87 ensures security of communication with the update server 22. In order to ensure the security of the communication with the update server 22, the communication-security ensuring unit 87 stores in advance, in a predetermined storage area, the public key of the update server 22, the secret key of the vehicle-mounted device 23, and the hash function. The public key of the update server 22, the secret key of the vehicle-mounted device 23, and the hash function are stored before shipment of the vehicle. The secret key of the vehicle-mounted device 23 and the hash function correspond to the public key 72 and the hash function 73 of the key management information 70.

Like the security ensuring unit 35 of the update server 22, the communication-security ensuring unit 87 ensures security of communication between the update server 22 and the vehicle-mounted device 23. That is, authentication of the update server 22 by the communication-security ensuring unit 87 and determination by the communication-security ensuring unit 87 that information received from the update server 22 is not tampered are performed in the same manner as the authentication of the vehicle-mounted device 23 by the security ensuring unit 35. In the authentication, first, the security ensuring unit 35 of the update server 22 calculates a hash value of transmission target data using the hash function. Subsequently, the security ensuring unit 35 encrypts the calculated hash value using the secret key of the update server 22 and creates a digital signature. The securing ensuring unit 35 of the update server 22 encrypts the created digital signature and the transmission target data using the public key of the vehicle-mounted device 23. The securing ensuring unit 35 of the update server 22 transmits the encrypted transmission target data and the encrypted digital signature to the vehicle-mounted device 23.

When receiving the encrypted transmission target data and the encrypted digital signature from the update server 22, the communication-security ensuring unit 87 decrypts the received information using the secret key of the vehicle-mounted device 23. Subsequently, the communication-security ensuring unit 87 decrypts the digital signature using the public key of the update server 22 and acquires the hash value. The communication-security ensuring unit 87 calculates a hash value of the transmission target data using the hash function. The communication-security ensuring unit 87 compares the calculated hash value and the hash value obtained by decrypting the digital signature. When the hash values coincide with each other, the communication-security ensuring unit 87 determines that the update server 22 is proper and determines that the transmission target data received from the update server 22 is not tampered. That is, the communication-security ensuring unit 87 determines that the data transmitted from the update server 22 is correctly received. On the other hand, when the hash values do not coincide with each other, the communication-security ensuring unit 87 determines that the data transmitted from the update server 22 is not correctly received.

It is assumed that the data transmitted from the vehicle-mounted device 23 to the update server 22 is added with the digital signature by the communication-security ensuring unit 87 before the transmission, encrypted, and transmitted. The transmission data includes configuration information transmitted to the update server 22 by the installation processing unit 84.

When determining that the update files transmitted from the update server 22 is not correctly received, the communication-security ensuring unit 87 notifies the update server 22 of status information including information indicating that the update files cannot be correctly received and identification information of the files that cannot be correctly received. When determining that the update files transmitted from the update server 22 are correctly received, the communication-security ensuring unit 87 notifies the update server 22 of status information including information indicating that the update files can be correctly received.

The abnormality processing unit 88 performs various kinds of abnormality processing performed when update of files by the remote maintenance is unsuccessful. Specifically, when consent of the owner is not obtained during the start of the remote installation, the abnormality processing unit 88 outputs a message to the effect that the remote maintenance cannot be performed because consent to the remote maintenance by the owner is not obtained. When authentication of the owner is unsuccessful during the start of the remote installation, the abnormality processing unit 88 outputs a message to the effect that the remote maintenance cannot be performed because the authentication of the owner cannot be performed. When the voltage of the battery before the update processing for the files indicates an abnormal value, the abnormality processing unit 88 outputs a message to the effect that the remote maintenance cannot be performed because a residual capacity of the battery is insufficient. Note that the output of the messages by the abnormality processing unit 88 may be performed immediately after the engine is started next time. The abnormality processing unit 88 may transmit a work log to the update server 22 after the output of the messages.

When the update processing for the files is unsuccessful, the abnormality processing unit 88 outputs a message to the effect that the update of the files is unsuccessful. When a critical error occurs and safety of the automobile 21 cannot be ensured, the abnormality processing unit 88 may control the vehicle to prevent the engine from being started.

The work-completion confirming unit 89 performs processing performed when the installation of the application target update files is successful. That is, the work-completion confirming unit 89 receives, from the verifying unit 36 of the update server 22, notification to the effect that the installation of the application target update files is successful. Then, the work-completion confirming unit 89 notifies the owner that the installation processing for the application target update files is correctly completed. The notification to the owner is performed by, for example, displaying to the effect that the installation is successful on a display device of the vehicle-mounted device 23. The work-completion confirming unit 89 acquires, from the owner, final confirmation information including information indicating that the owner confirms that the installation processing for the update files is correctly completed and information indicating that the owner consents to enabling of the update files. Then, the work-completion confirming unit 89 stores the final confirmation information in a predetermined storage area as evidence and instructs the ECUs 24 to enable the update files. The work-completion confirming unit 89 transmits the final confirmation information and work log information of a series of the installation processing to the update server 22. Note that the work-completion confirming unit 89 records work logs of the reception processing and the installation processing for the update files.

The reliability checking unit 801 checks genuineness of an application operating in the vehicle-mounted device 23. Specifically, for example, the reliability checking unit 801 stores in advance, in a predetermined storage area, a hash value for checking genuineness of applications started in the vehicle-mounted device 23. When an application is started, the reliability checking unit 801 compares a hash value of the application with the hash value for checking genuineness stored in advance and, when the hash value coincide with each other, determines that the application is genuine. The applications, genuineness of which is checked by the reliability checking unit 801, include applications for providing the functions of the recording unit 81, the state confirming unit 82, the residual-capacity confirming unit 83, the installation processing unit 84, and the authenticating unit 85. Further, the applications, genuineness of which is checked by the reliability checking unit 801, include applications for providing the functions of the receiving unit 86, the communication-security ensuring unit 87, the abnormality processing unit 88, and the work-completion confirming unit 89. Similarly, concerning applications of the ECUs 24 that communicate with the installation processing unit 84, the reliability checking unit 801 performs a check of genuineness through comparison of hash values. The applications of the ECUs 24 include, for example, an application for acquiring configuration information of the ECUs 24. Note that the function of the reliability checking unit 801 may be provided by a TPM. The TPM is a security chip having hardware tamper resistance. The TPM can be used as a reliability reference to ensure reliability of the applications, hash values of which are checked.

Reliability of data transmitted from the vehicle-mounted device 23 to the update server 22 can be secured by the reliability checking unit 801. For example, the reliability checking unit 801 can guarantee genuineness of the vehicle history information 90, the authentication information, the consent confirmation information, the status information, the final confirmation information, and the work logs.

Figure 11:
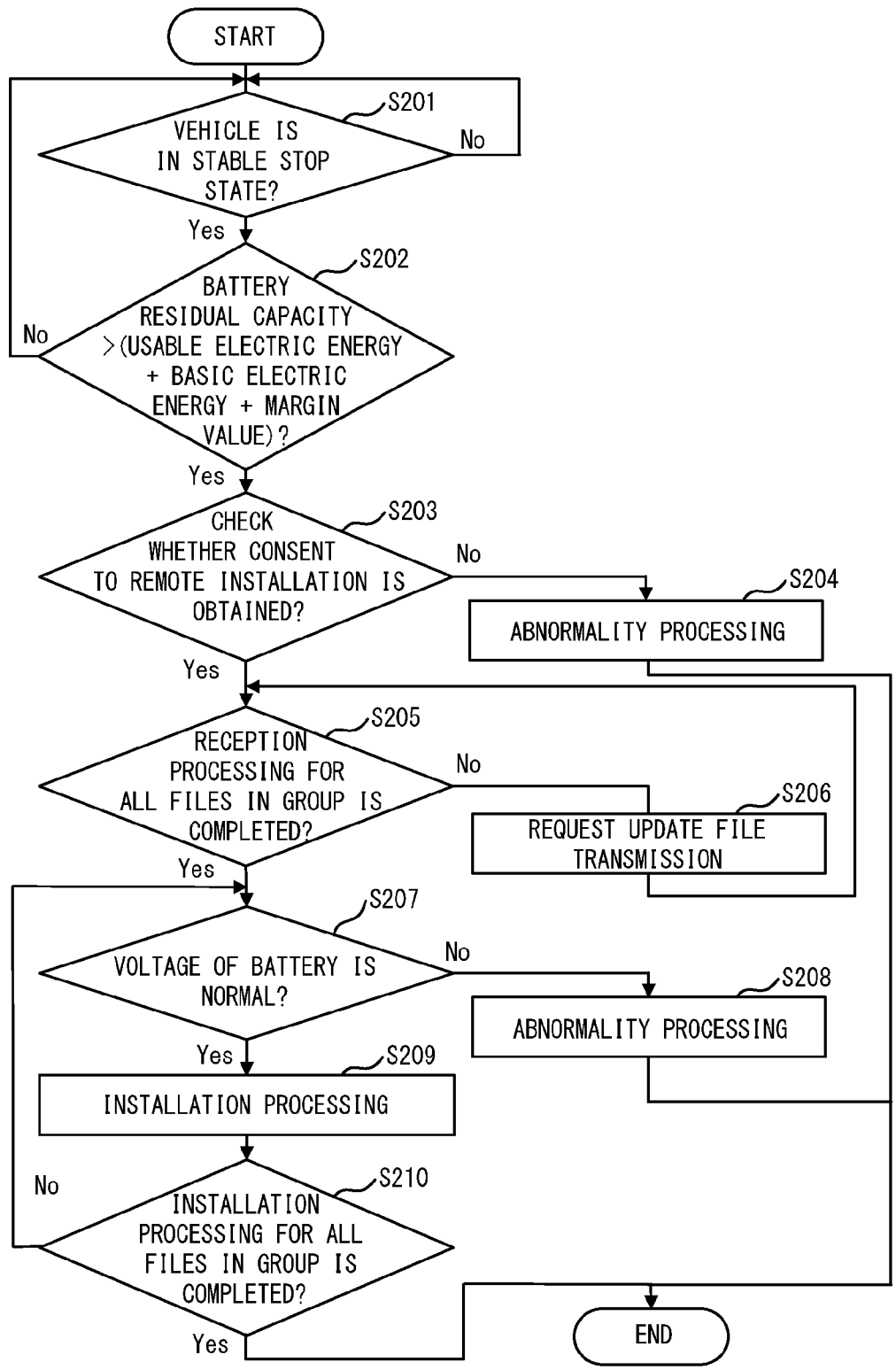
FIG. 11 is a flowchart illustrating an operation flow of installation processing in the vehicle-mounted device.

FIG. 11 is a flowchart illustrating an operation flow of the installation processing in the vehicle-mounted device 23.

In FIG. 11, first, the state confirming unit 82 determines whether the target vehicle is in a stable stop state (S201). When the state confirming unit 82 determines that the target vehicle is not in the stable stop state (No in S201), the processing returns to S201.

When the state confirming unit 82 determines in S201 that the target vehicle is in the stable stop state (Yes in S201), the residual-capacity confirming unit 83 determines whether the present residual capacity of the battery of the vehicle is larger than an added-up value of the usable electric energy, the basic electric energy, and the predetermined margin value (S202). When the residual-capacity confirming unit 83 determines that the present residual capacity of the battery of the vehicle is equal to or smaller than the added-up value of the usable electric energy, the basic electric energy, and the predetermined margin value (No in S202), the processing transitions to S201. When the residual-capacity confirming unit 83 determines that the present residual capacity of the battery of the vehicle is equal to or smaller than the added-up value of the usable electric energy, the basic electric energy, and the predetermined margin value, the abnormality processing unit 88 may, for example, display a message to the effect that the remote installation cannot be carried out because the residual capacity of the battery is insufficient.

When residual-capacity confirming unit 83 determines in S202 that the present battery residual capacity is larger than the added-up value of the usable electric energy, the basis electric energy, and the predetermined margin value (Yes in S202), the authenticating unit 85 checks whether consent to the remote maintenance of the target vehicle from the owner is obtained (S203).

When the authenticating unit 85 determines that the consent to the remote maintenance of the target vehicle from the owner is not obtained (No in S203), the abnormality processing unit 88 performs abnormality processing (S204). That is, when the consent to the remote maintenance of the target vehicle from the owner is not obtained, the abnormality processing unit 88 outputs a message to the effect that the remote maintenance cannot be performed because the consent to the remote maintenance by the owner is not obtained. When the authentication of the owner is unsuccessful during the start of the remote installation, the abnormality processing unit 88 outputs a message to the effect that the remote maintenance cannot be performed because the authentication of the user cannot be performed. Then, the processing ends.

On the other hand, when the authenticating unit 85 determines in S203 that the consent to the remote maintenance of the target vehicle from the owner is obtained (Yes in S203), the receiving unit 86 determines whether all the update files included in the divided group are already received (S205). When determining that not all the update files included in the target group are already received (No in S205), the receiving unit 86 transmits a transmission request for the update file to the update server 22 (S206). The processing transitions to S205.

When the receiving unit 86 determines in S205 that all the update files included in the target group are already received (Yes in S205), the residual-capacity confirming unit 83 determines whether the voltage of the battery is normal (S207).

When the residual-capacity confirming unit 83 determines in S207 that the voltage of the battery is abnormal (No in S207), the abnormality processing unit 88 executes the abnormality processing (S208). That is, for example, the abnormality processing unit 88 outputs a message to the effect that the remote maintenance cannot be performed because the residual capacity of the battery is insufficient. The abnormality processing unit 88 may perform rollback processing for the files of the group, the installation of which is successful. Then, the processing ends.

On the other hand, when the residual-capacity confirming unit 83 determines in S207 that the voltage of the battery is normal (Yes in S207), the installation processing unit 84 executes the installation of the file (S209).

Subsequently, the installation processing unit 84 determines whether the installation of all the files of the target group ends (S210). When the installation processing unit 84 determines that the installation of any one of the files of the target group does not end (No in S210), the processing transitions to S207.

On the other hand, when the installation processing unit 84 determines in S210 that the installation of all the files of the target group ends (Yes in S210), the processing ends.

Note that the flow of FIG. 11 is carried out for each divided predetermined group. The start of the flow of FIG. 11 may be performed in a state in which reception of all the update files included in the predetermined group from the update server 22 is completed. When the installation processing for one group is completed (e.g., when the flow of FIG. 11 in the first time is completed), charging of the battery is carried out by, for example, traveling of the vehicle before the installation processing for the next group (the flow of FIG. 11 in the second time) is carried out. If the installation of the update files is dividedly performed, when the engine is started for the first time after the installation processing for one group is completed, the recording unit 81 may notify the owner to the effect that the remaining installation work is planned in another day.

The flow of FIG. 11 may be started at an instance when an engine stop key is turned. In that case, the acquisition of the consent of the owner in starting the installation in S203, which is carried out in checking whether the consent to the remote maintenance of the target vehicle from the owner is obtained, may be performed immediately after the stop.

Figure 12:
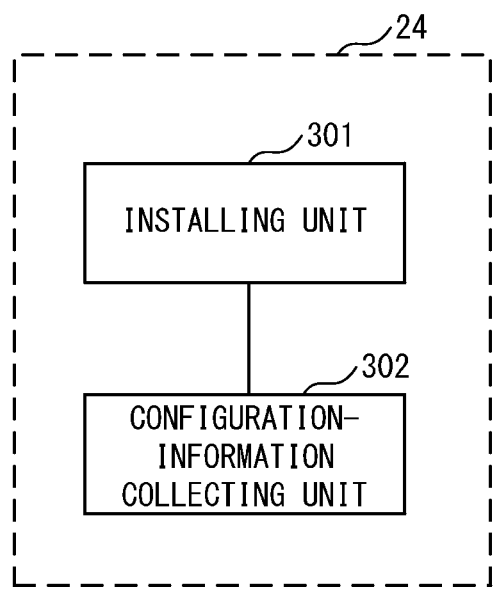
FIG. 12 illustrates an example of the configuration of the ECU according to the embodiment.

The configuration of the ECU 24 is explained. FIG. 12 illustrates an example of the configuration of the ECU according to this embodiment. In FIG. 12, the ECU 24 includes an installing unit 301 and a configuration-information collecting unit 302.

The installing unit 301 receives an instruction for carrying out the installation processing including the update files from the vehicle-mounted device 23. Then, the installing unit 301 installs the received update files. However, the installation processing unit does not perform enabling of update (e.g., start in updated software) before an instruction for enabling is received from the vehicle-mounted device 23.

After the installation processing for the update files by the installing unit 301, the configuration-information collecting unit 302 collects configuration information of the software. The configuration-information collecting unit 302 transmits completion notification of the installation including the collected configuration information to the vehicle-mounted device 23.

When receiving an instruction for rollback from the vehicle-mounted device 23, the installing unit 301 discards a change in the installation processing and returns the software to a state immediately before the application processing. The installing unit 301 transmits a work log to the vehicle-mounted device 23. The work log is data of work logs of the installation processing by the installing unit 301 and enabling processing or rollback processing after the installation processing.

When receiving a retry instruction for the installation from the vehicle-mounted device 23, the installing unit 301 carries out the installation processing for the update files again.

Note that the rollback processing may be realized by backing up, in a predetermined storage area, a state of the software immediately before the start of the installation processing of the update files (or acquiring a snapshot). In this case, when receiving an installation instruction for the target files from the vehicle-mounted device 23, first, the installing unit 301 acquires a backup of the update target software. When the acquisition of the backup is completed, the installing unit 301 installs the update files. Thereafter, when receiving an instruction for rollback from the vehicle-mounted device 23, the installing unit 301 returns the back-up data to thereby restore the update target software to a state immediately before the start of the installation processing.

Note that, in this embodiment, it is assumed that security of communication between the vehicle-mounted device 23 and the ECU 24 is ensured. When the security between the vehicle-mounted device 23 and the ECU 24 is not ensured, as in the communication between the vehicle-mounted device 23 and the update server 22, the security of the communication between the vehicle-mounted device and the ECU 24 may be ensured by adding a signature to communication data.

Enabling of the update files in the ECU 24 is explained. The ECU 24 includes two environments for readout and for the update processing. The environment for readout is an environment in which currently-enabled software is operating. The environment for the update processing is an environment used in the installation processing for update files. When aversion of the currently-enabled software of the environment for readout is represented as (A), software of the environment for the update processing is an immediately preceding version (A−1). When the installation of the update files is applied to the software of (A−1), the software is updated to software of (A+1). Thereafter, when success of the installation is confirmed, the ECU 24 is instructed to enable the update files. In the enabling of the update files, the environment for the update processing is switched to the environment for readout and the environment for readout is switched to the environment for the update processing. Then, the software of the version (A+1) operates on the ECU 24. In this way, the installation and the enabling of the update files are performed in the ECU 24.

Figure 13:
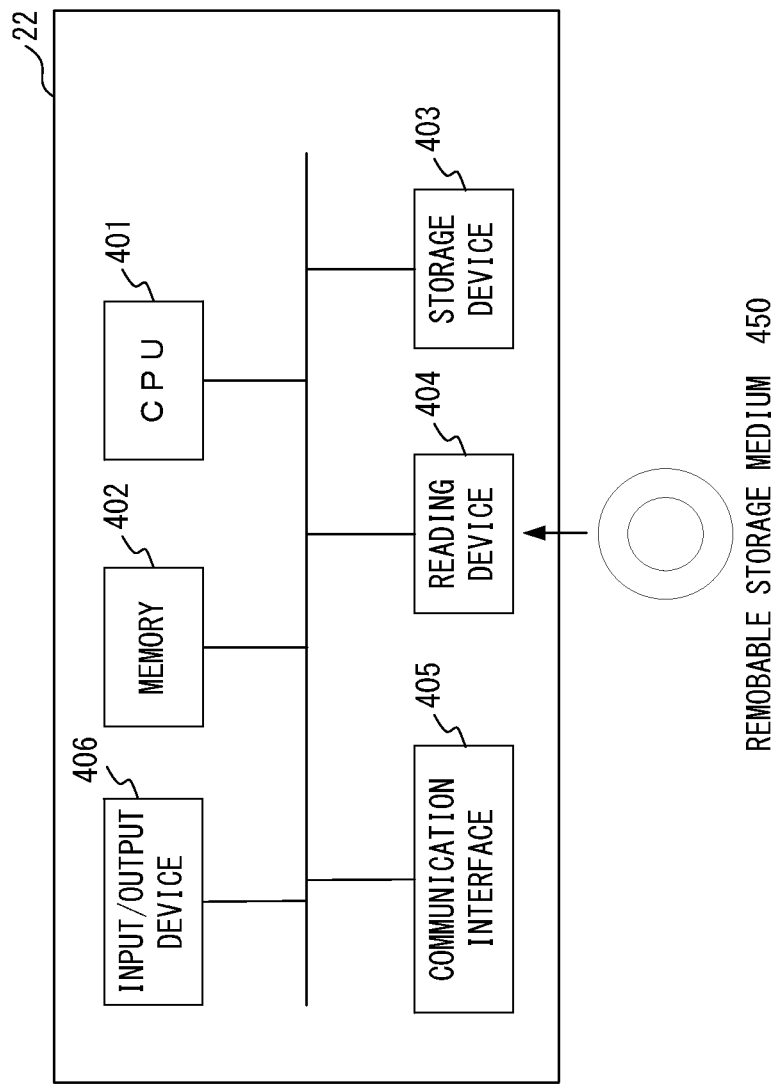
FIG. 13 illustrates an example of a hardware configuration of the update server.

The configuration of the update server 22 is explained. FIG. 13 illustrates an example of a hardware configuration of the update server 22.

The update server 22 includes a Central Processing Unit (CPU) 401, a memory 402, a storage device 403, a reading device 404, a communication interface 405, and an input/output device 406. The CPU (processor) 401, the memory 402, the storage device 403, the reading device 404, the communication interface 405, and the input/output device 406 are connected via a bus.

The CPU 401 executes a computer program, which describes the procedure of the flowchart explained above, using the memory 402 to thereby provide functions of a part or all of the authenticating unit 31, the power calculating unit 32, the dividing unit 33, the transmitting unit 34, the security ensuring unit 35, and the verifying unit 36.

The memory 402 is, for example, a semiconductor memory and includes a Random Access Memory (RAM) area and a Read Only Memory (ROM) area. The storage device 403 is, for example, a hard disk. Note that the storage device 403 may be a semiconductor memory such as a flash memory. The storage device 403 may be an external recording device. The storage device 403 is an example of the storage unit 1.

The reading device 404 accesses a removable storage medium 450 according to an instruction of the CPU 401. The removable storage medium 450 is realized by, for example, a semiconductor device (a USB memory, etc.), a medium to which information is input and from which information is output by magnetic action (a magnetic disk, etc.), or a medium to which information is input and from which information is output by optical action (a CD-ROM, a DVD, etc.). Note that the reading device 404 does not have to be included in the update server 22.

The communication interface 405 is connected to the vehicle-mounted device 23 and transmits and receives data to and from the vehicle-mounted device 23 via a network according to an instruction of the CPU 401. The communication interface 405 may be connected to other information processing apparatuses.

The input/output device 406 is, for example, a device that receives an instruction from a user or a display device that displays information. Note that the input/output device 406 does not have to be included in the update server 22.

A computer program in this embodiment is provided to the update server 22, for example, in forms described below.
(1) The computer program is installed in the storage device 403 in advance.
(2) The computer program is provided by the removable storage medium 450.
(3) The computer program is provided from a program server (not illustrated in the figure) via the communication interface 405.

Further, a part of the update server 22 in this embodiment may be realized by hardware. Alternatively, the update server 22 in this embodiment may be realized by a combination of software and hardware.

Figure 14:
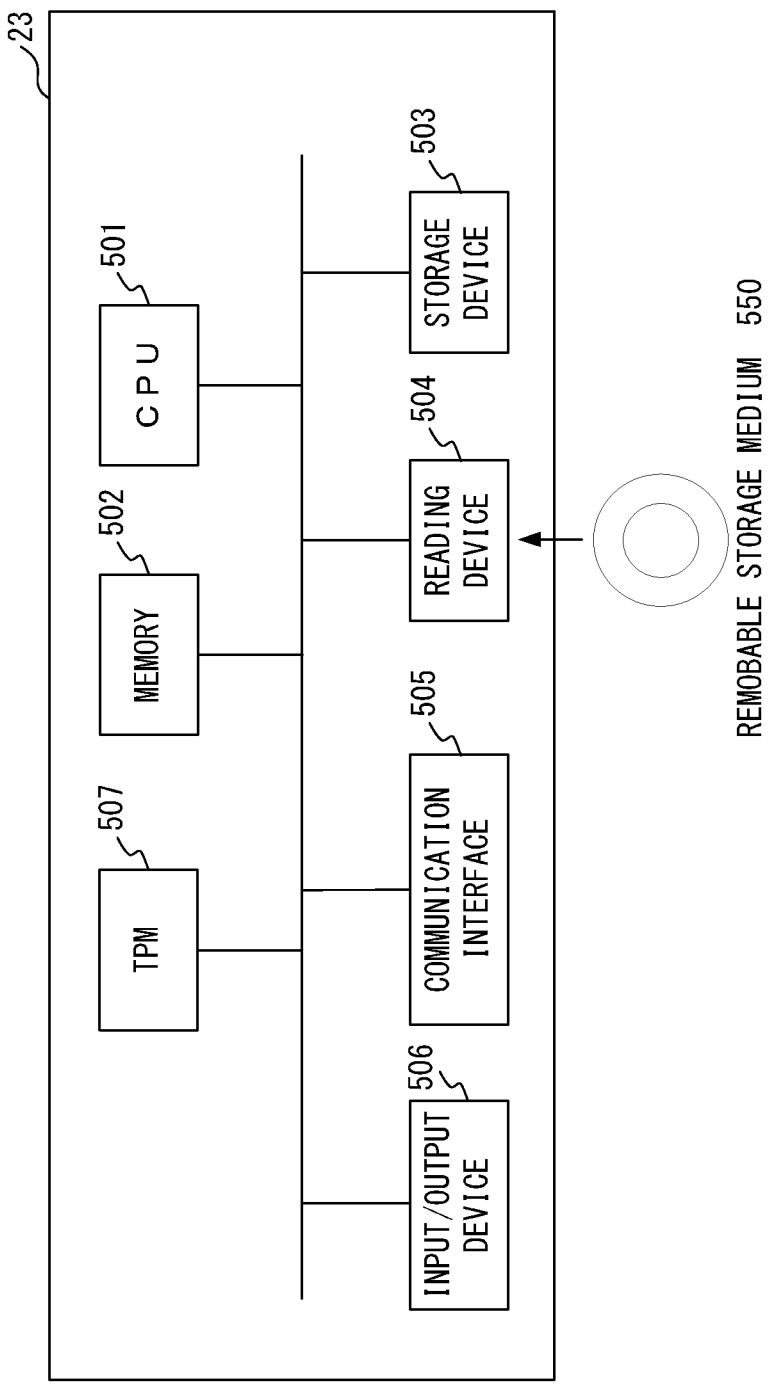
FIG. 14 illustrates an example of a hardware configuration of the vehicle-mounted device.

The configuration of the vehicle-mounted device 23 is explained. FIG. 14 illustrates an example of a hardware configuration of the vehicle-mounted device 23.

The vehicle-mounted device 23 includes a CPU (processor) 501, a memory 502, a storage device 503, a reading device 504, a communication interface 505, an input/output device 506, and a TPM 507. The CPU 501, the memory 502, the storage device 503, the reading device 504, the communication interface 505, the input/output device 506, and the TPM 507 are connected via a bus.

The CPU 501 executes a computer program, which describes the procedure of the flowchart, using the memory 502 to thereby provide functions of a part of all of the recording unit 81, the state confirming unit 82, the residual-capacity confirming unit 83, the installation processing unit 84, and the authenticating unit 85. The CPU 501 provides functions of a part or all of the receiving unit 86, the communication-security ensuring unit 87, and the abnormality processing unit 88.

The memory 502 is, for example, a semiconductor memory and includes a RAM area and a ROM area. The storage device 503 is, for example, a hard disk and stores the computer program in this embodiment. Note that the storage device 503 may be a semiconductor memory such as a flash memory. The storage device 503 may be an external recording device.

The recording device 504 accesses the removable storage medium 550 according to an instruction of the CPU 501. The removable storage medium 550 is realized by, for example, a semiconductor device (a USB memory, etc.), a medium to which information is input and from which information is output by magnetic action (a magnetic disk, etc.), or a medium to which information is input and from which information is output by optical action (a CD-ROM, a DVD, etc.). Note that the reading device 504 does not have to be included in the vehicle-mounted device 23.

The communication interface 505 is connected to the update server 22 and transmits and receives data via a network according to an instruction of the CPU 501. The communication interface 505 is connected to the ECUs 24 and transmits and receives data via a network according to an instruction of the CPU 501.

The input/output device 506 is, for example, a display device that displays information. A warning to the user and an installation result of the update files are output to the input/output device 506. For example, the input/output device 506 may be a camera, a microphone, a fingerprint sensor, a touch panel, or the like. The consent to the remote maintenance from the owner, the authentication information, and the final confirmation information are acquired via the input/output device 506.

The TPM 507 is a security chip capable of checking reliability of a computer program operating on the CPU 501. The TPM 507 provides a part or all of the function of the reliability checking unit 801. The hash value used by the reliability checking unit 801 in checking genuineness of an application is stored in a predetermined storage area in the TPM 507.

The computer program in this embodiment is provided to the vehicle-mounted device 23, for example, in forms described below.
(1) The computer program is installed in the storage device 503 in advance.
(2) The computer program is provided by the removable storage medium 550.
(3) The computer program is provided from a program server (not illustrated in the figure) or the update server 22 via the communication interface 505.

Further, a part of the vehicle-mounted device 23 in this embodiment may be realized by hardware. Alternatively, the vehicle-mounted device 23 in this embodiment may be realized by a combination of software and hardware.

Note that the function of the vehicle-mounted device 23 may be included in any one of the ECUs 24.

According to an embodiment, it is possible to provide a method of preventing exhaustion of a battery in update processing for software operating in an automobile.

The present invention is not limited to the embodiment explained above and can take various configurations or embodiments without departing from the spirit of the present invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a processing apparatus mounted on an installation target vehicle to execute a process, comprising:
   receiving, by the processing apparatus, a correction program among correction programs, which are classified into a plurality of groups, respectively, when a total value of expected power consumption to be used for installing the correction program for a control program in a controller configured to execute the control program and mounted on the installation target vehicle is larger than an amount of usable electric energy of a battery corresponding to a vehicle type to which the installation target vehicle belongs, information of the useable electric energy being retrieved from a memory of a server which stores a correspondence relationship between a plurality of vehicle types including the vehicle type of the installation target vehicle and a plurality of useable electric energies of batteries including the battery corresponding to the vehicle type of the installation target vehicle, the plurality of useable electric energies of batteries being calculated as a difference between respective amounts of the batteries secured to start engines of the plurality of vehicle types including the vehicle type of the installation target vehicle and maximum capacities of the batteries including the battery corresponding to the vehicle type of the installation target vehicle; and
   installing, by the processing apparatus, according to the amount of useable electric energy of the battery corresponding to the vehicle type of the installation target vehicle and history information indicating stop periods of time of the installation target vehicle and stop positions of the installation target vehicle, the correction program.

2. The non-transitory computer-readable recording medium according to claim 1, wherein
   a number of the plurality of groups is determined based on the total value of the expected power consumption and the usable electric energy.

3. The non-transitory computer-readable recording medium according to claim 1, the process further comprising:
   transmitting confirmation information indicating whether a correction program classified into a first group among the plurality of groups is normally received,
   wherein transmission of a correction program classified into a second group among the plurality of groups is started after confirming, using the confirmation information, that the correction program classified into the first group is normally received.

4. The non-transitory computer-readable recording medium according to claim 1, wherein
   the total value of the expected power consumption is calculated based on a power consumption used for installing a correction program of a unit size stored in a memory in association with each controller.

5. The non-transitory computer-readable recording medium according to claim 1, wherein
   the installing includes installing, at a timing when the installation target vehicle is expected to stop for a predetermined time or more, the correction program classified into any one of the plurality of groups.

6. The non-transitory computer-readable recording medium according to claim 1, wherein
   the installing includes installing the correction program classified into any one of the plurality of groups when the amount of useable electric energy of the battery of the installation target vehicle is equal to or larger than a predetermined threshold.

7. The non-transitory computer-readable recording medium according to claim 1, wherein
   a plurality of control programs operate in the installation target vehicle, and
   the plurality of correction programs are classified, corresponding to an update request, into the plurality of groups based on whether the plurality of control programs have a predetermined relation.

8. An information processing method of a system including a first information processing apparatus and a second information processing apparatus where the first information processing apparatus delivers a correction program to the second information processing apparatus, the information processing method comprising:
   receiving, from a vehicle in which a control program for controlling devices mounted on the vehicle operates, an update request concerning the control program;
   classifying, by a processor of the first information processing apparatus, a plurality of correction programs corresponding to the update request into a plurality of groups, respectively, when a total value of expected power consumption to be used for installing the correction program for a control program in a controller configured to execute the control program and mounted on an installation target vehicle is larger than an amount of usable electric energy of a battery corresponding to a vehicle type to which the vehicle belongs, information of the useable electric energy being retrieved from a memory of a server which stores a correspondence relationship between a plurality of vehicle types including the vehicle type of the vehicle and a plurality of useable electric energies of batteries including the battery corresponding to the vehicle type of the vehicle, the plurality of useable electric energies of batteries being calculated as a difference between respective amounts of the batteries secured to start engines of the plurality of vehicle types including the vehicle type of the vehicle and maximum capacities of the batteries including the battery corresponding to the vehicle type of the vehicle; and transmitting, by the processor of the first information processing apparatus, the correction program to the vehicle,
wherein the first information processing apparatus is provided outside the vehicle and the second information processing apparatus is mounted on the vehicle, and
wherein the second information processing apparatus obtains the amount of useable electric energy of the battery of the vehicle, and installs, according to the obtained amount of useable electric energy, the correction program.

9. An information processing method, comprising:
receiving, by a processor having a memory, a correction program among correction programs which are classified into a plurality of groups, respectively, when a total value of expected power consumption to be used for installing the correction program for a control program in a controller configured to execute the control program and mounted on an installation target vehicle is larger than an amount of usable electric energy of a battery corresponding to a vehicle type to which the installation target vehicle belongs, information of the useable electric energy being retrieved from a memory of a server which stores a correspondence relationship between a plurality of vehicle types including the vehicle type of the installation target vehicle and a plurality of useable electric energies of batteries including the battery corresponding to the vehicle type of the installation target vehicle, the plurality of useable electric energies of batteries being calculated as a difference between respective amounts of the batteries secured to start engines of the plurality of vehicle types including the vehicle type of the installation target vehicle and maximum capacities of the batteries including the battery corresponding to the vehicle type of the installation target vehicle; and
installing, by the processor, according to the amount of useable electric energy of the battery corresponding to the vehicle type of the installation target vehicle and history information indicating stop periods of time of the installation target vehicle and stop positions of the installation target vehicle, the correction program.

10. An information processing apparatus, comprising:
a memory; and
a processor configured to:
receive a correction program among correction programs, which are classified into a plurality of groups, respectively, when a total value of expected power consumption to be used for installing the correction program for a control program in a controller configured to execute the control program and mounted on an installation target vehicle is larger than an amount of usable electric energy of a battery corresponding to a vehicle type to which the installation target vehicle belongs, information of the useable electric energy being retrieved from a memory of a server which stores a correspondence relationship between a plurality of vehicle types including the vehicle type of the installation target vehicle and a plurality of useable electric energies of batteries including the battery corresponding to the vehicle type of the installation target vehicle, the plurality of useable electric energies of batteries being calculated as a difference between respective amounts of the batteries secured to start engines of the plurality of vehicle types including the vehicle type of the installation target vehicle and maximum capacities of the batteries including the battery corresponding to the vehicle type of the installation target vehicle, and
install, according to the amount of useable electric energy of the battery corresponding to the vehicle type the installation target vehicle and history information indicating stop periods of time of the installation target vehicle and stop positions of the installation target vehicle, the correction program.

11. An information processing system comprising:
a first information processing apparatus; and
a second information processing apparatus, the first information processing apparatus delivering a plurality of correction programs to the second information processing apparatus,
the first information processing apparatus including:
a first memory configured to store an amount of usable electric energy of a battery corresponding to a vehicle type to which a vehicle belongs; and
a first processor configured to receive, from the vehicle in which a control program for controlling devices mounted on the vehicle operates, an update request concerning the control program, to refer to, in the first memory, the amount of usable electric energy, to classify the plurality of correction programs corresponding to the update request into a plurality of groups, respectively, when a total value of expected power consumption used for installing the correction program for a control program in a controller configured to execute the control program and mounted on the vehicle is larger than the amount of the usable electric energy, and to transmit the correction program to the vehicle, information of the useable electric energy being retrieved from a memory of a server which stores a correspondence relationship between a plurality of vehicle types including the vehicle type of the vehicle and a plurality of useable electric energies of batteries including the battery corresponding to the vehicle type of the vehicle, the plurality of useable electric energies of batteries being calculated as a difference between respective amounts of the batteries secured to start engines of the plurality of vehicle types including the vehicle type of the vehicle and maximum capacities of the batteries including the battery corresponding to the vehicle type of the vehicle; and
the second information processing apparatus including:
a second memory, and
a second processor configured to:
receive the correction program, which is among the plurality of correction programs classified into the plurality of groups by the first information processing apparatus and store the correction programs in the second memory,
obtain the amount of useable electric energy of the battery of the vehicle, and
install, according to the obtained the amount of useable electric energy, the correction program,
wherein the first information processing apparatus is provided outside the vehicle and the second information processing apparatus is mounted on the vehicle.

12. The information processing system according to claim 11, wherein
a number of the plurality of groups is determined based on the total value of the expected power consumption and the usable electric energy.

13. The information processing system according to claim 11, wherein
the first processor receives confirmation information indicating whether a correction program classified into a first group among the plurality of groups is normally received, and
starts transmission of a correction program classified into a second group among the plurality of groups, after confirming, using the confirmation information, that the correction program classified into the first group is normally received.

14. The information processing system according to claim 11, wherein
the first processor calculates the total value of the expected power consumption based on a power consumption used for installing a correction program of a unit size stored in a memory in association with each the control unit.

15. The information processing system according to claim 11, wherein
a plurality of control programs operate in the vehicle, and
the first processor classifies the plurality of correction programs corresponding to the update request into the plurality of groups based on whether the plurality of control programs have a predetermined relation.

* * * * *